United States Patent
Hatano et al.

(10) Patent No.: US 7,711,614 B2
(45) Date of Patent: May 4, 2010

(54) CONTENT DELIVERY METHOD, CONTENT DELIVERY SERVICE COMPUTER, CONTENT DELIVERY SERVICE SYSTEM, DATA DISCARD RECOGNITION METHOD, DATA DISCARD RECOGNITION COMPUTER, AND TERMINAL

(75) Inventors: Kouji Hatano, Tokyo (JP); Yoshihiro Tsukamoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 11/574,731

(22) PCT Filed: Sep. 1, 2005

(86) PCT No.: PCT/JP2005/016012
§ 371 (c)(1),
(2), (4) Date: Mar. 6, 2007

(87) PCT Pub. No.: WO2006/040884
PCT Pub. Date: Apr. 20, 2006

(65) Prior Publication Data
US 2007/0255632 A1    Nov. 1, 2007

(30) Foreign Application Priority Data
Oct. 15, 2004   (JP)   .............................. 2004-301273
Oct. 15, 2004   (JP)   .............................. 2004-301279

(51) Int. Cl.
*G06Q 10/00* (2006.01)
(52) U.S. Cl. ........................................ 705/28; 709/224
(58) Field of Classification Search .................. 341/50; 370/236; 702/188; 705/43, 57, 67, 59; 709/203, 709/206, 248, 224; 386/46, 52, 55
See application file for complete search history.

(56) References Cited
U.S. PATENT DOCUMENTS
5,930,357 A    7/1999   Fukui 6,775,461 B2 *   8/2004   Poslinski et al. .............. 386/46
(Continued)

FOREIGN PATENT DOCUMENTS
JP    07-064786 A    3/1995
(Continued)

OTHER PUBLICATIONS
"HP: HP and SAVVIS provide media industry with first comprehensive media service platform for managing and distributing digital content; Unified managed service, delivered as an on-demand utility, enables large community of users to collaborate and speed workflow—and reduce cost" M2 Presswire Nov. 18, 2003 ProQuest Newsstand, ProQuest. Web. 17 D.*
(Continued)

*Primary Examiner*—Matthew S Gart
*Assistant Examiner*—Mohammad R Ullah Masud
(74) *Attorney, Agent, or Firm*—Pearne & Gordon LLP

(57) ABSTRACT

There is provided a contents distribution method in which burdens imposed on a distribution service provider and a contents user are lightened so that the contents user can use contents as many as possible at low cost. A system comprises terminal apparatuses 1, a portal server 3, a contents DB 4, a contents distribution server 5, a cabinet management server 6, and an accounting server 7. The cabinet management server 6 manages the contents usable limit and contents storage status of each of the terminal apparatuses 1. The portal server 3 and the cabinet management server 6 cooperate with each other to generate the contents usable limit for each terminal apparatus 1 and instruct the contents distribution server 5 to distribute contents in accordance with a contents distribution request given from the terminal apparatus 1. To distribute the contents, the remaining capacity of the contents usable limit in the terminal apparatus 1 is obtained based on information concerned with available contents and deleted contents in the terminal apparatus 1 so that an instruction is given to distribute the contents within the remaining capacity.

20 Claims, 26 Drawing Sheets

U.S. PATENT DOCUMENTS

| | | | |
|---|---|---|---|
| 6,792,395 B2 * | 9/2004 | Roberts | 702/188 |
| 6,996,563 B2 | 2/2006 | Kumagai et al. | |
| 2003/0154187 A1 | 8/2003 | Hayakawa et al. | |
| 2004/0140975 A1 | 7/2004 | Saito et al. | |
| 2004/0143661 A1 * | 7/2004 | Higashi et al. | 709/224 |

FOREIGN PATENT DOCUMENTS

| | | |
|---|---|---|
| JP | 2000-305776 A | 11/2000 |
| JP | 2001-195464 | 7/2001 |
| JP | 2001-297263 A | 10/2001 |
| JP | 2001-325234 | 11/2001 |
| JP | 2002-55864 | 2/2002 |
| JP | 2003-006049 A | 1/2003 |
| JP | 2003-242037 | 8/2003 |
| JP | 2004-139440 A | 5/2004 |

OTHER PUBLICATIONS

Japanese Office Action.

* cited by examiner

FIG. 2

| CONTENTS STATUS: ID=C87911 | | | | |
|---|---|---|---|---|
| INFORMATION NUMBER | CONTENTS ID | CABINET ID | STATUS | CONTENTS STORAGE PATH | CONTENTS DETAILS |
| inf00000 | cnt4397 | cab1844927 | deleted | c:¥abc¥cnt001¥tt1573.aac | 5E 00 31 48 FB E6 |
| inf00001 | cnt1905 | cab1844927 | available | c:¥abc¥cnt001¥ta3990.aac | A7 89 00 F1 35 67 |
| inf00002 | cnt5293 | cab1844927 | available | c:¥abc¥cnt001¥tb7701.aac | BB 18 90 9E 3B B2 |
| inf00003 | cnt5945 | cab1903944 | deleted | c:¥abc¥cnt001¥tq0228.aac | E8 98 14 5C B4 3D |

FIG. 3

| CHANGE HISTORY: ID=H28719 | | | | | |
|---|---|---|---|---|---|
| CHANGE NUMBER | CHANGE TIME | CHANGE KIND | CABINET ID | CONTENTS ID | SERVER REPORT TIME |
| e00000 | 20030612151029 | buy | cab1844927 | – | 20030612151029 |
| e00001 | 20030612153810 | add | cab1844927 | cnt4397 | 20030612153810 |
| e00002 | 20030612153812 | add | cab1844927 | cnt1905 | 20030612153812 |
| e00003 | 20030613220847 | del | cab1844927 | cnt4397 | 20030613220958 |
| e00004 | 20030613221031 | add | cab1844927 | cnt5293 | 20030613221031 |
| e00005 | 20030614201053 | buy | cab1903944 | – | 20030614201053 |
| e00006 | 20030614201411 | add | cab1903944 | cnt5945 | 20030614201411 |
| e00007 | 20030615195322 | del | cab1903944 | cnt5945 | – |

FIG. 5(a)

| CONTENTS STATUS: ID=C87911 | | |
|---|---|---|
| INFORMATION NUMBER | CONTENTS ID, CABINET ID, STATUS, CONTENTS STORAGE PATH | CONTENTS DETAILS |
| inf00000 | ... | |
| inf00001 | ... | |
| inf00002 | ... | |
| inf00003 | ... | |

FIG. 5(b)

| CHANGE HISTORY: ID=H28719 | | |
|---|---|---|
| CHANGE NUMBER | CHANGE TIME, CHANGE KIND, CABINET ID, CONTENTS ID | SERVER REPORT TIME |
| e00007 | ... | 20030615... |

FIG. 5(C)

8Aq302GiPwC74AqpfFg8qptuSgl7Xs9R

FIG. 6

```
           <status-report>
           <history>
            <id>H28719</id>
            <event>
              <seq-number>e00007</seq-number>
601           <event-date>20030615195322</occurrence>
              <event-type>del</event-type>
              <cabinet-id>cab1903944</cabinet>
              <content-id>cnt5945</content>
              <reported-date>20030616082017</reported>
            </event>
           </history>

<content-status>
            <id>C87911</id>
            <content>
              <seq-number>inf00000</seq-number>
              <content-id>cnt4397</contnt-id>
              <cabinet-id>cab1844927</cabinet-id>
              <status>deleted</status>
              <file-path>"c:¥abc¥cnt001¥tt1573.aac"</file-path>
              <binary-code>"5E003148FBE6"</binary-code>
            </content>
            <content>
              <seq-number>inf00001</seq-number>
              <content-id>cnt1905</contnt-id>
              <cabinet-id>cab1844927</cabinet-id>
              <status>available</status>
              <file-path>"c:¥abc¥cnt001¥ta3990.aac"</file-path>
              <binary-code>"A78900F13567"</binary-code>
602         </content>
            <content>
              <seq-number>inf00002</seq-number>
              <content-id>cnt5293</contnt-id>
              <cabinet-id>cab1844927</cabinet-id>
              <status>available</status>
              <file-path>"c:¥abc¥cnt001¥tb7701.aac"</file-path>
              <binary-code>"BB18909E3BB2"</binary-code>
            </content>
            <content>
              <seq-number>inf00003</seq-number>
              <content-id>cnt5945</contnt-id>
              <cabinet-id>cab1903944</cabinet-id>
              <status>deleted</status>
              <file-path>"c:¥abc¥cnt001¥tq0228.aac"</file-path>
              <binary-code>"E898145CB43D"</binary-code>
            </content>
           </content-status>
           </status-report>

603  { <date>20030616082017</date>
           <signature>8Aq302GiPwC74AqpfFg8qptuSgl7Xs9R</signature>
```

FIG. 8

| VERIFICATION NUMBER | REGISTRATION TIME | VALIDATED PERIOD |
|---|---|---|
| : | : | : |
| ver17288190 | 20030613220821 | 20030613230821 |
| ver49102371 | 20030614201157 | 20030614211157 |
| ver81945271 | 20030615231842 | 20030616001842 |

FIG. 9

CONTENTS STATUS: ID=C87911

| INFORMATION NUMBER | CONTENTS ID | CABINET ID | STATUS | CONTENTS STORAGE PATH | CONTENTS DETAILS |
|---|---|---|---|---|---|
| inf00000 | cnt4397 | cab1844927 | deleted | c:¥abc¥cnt001¥tt1573.aac | 5E 00 31 48 FB E6 |
| inf00001 | cnt1905 | cab1844927 | available | c:¥abc¥cnt001¥ta3990.aac | A7 89 00 F1 35 67 |
| inf00002 | cnt5293 | cab1844927 | available | c:¥abc¥cnt001¥tb7701.aac | BB 18 90 9E 3B B2 |
| inf00003 | cnt5945 | cab1903944 | available | c:¥abc¥cnt001¥tq0228.aac | 98 E1 32 90 74 3D |

FIG. 10

CHANGE HISTORY: ID=H28719

| CHANGE NUMBER | CHANGE TIME | CHANGE KIND | CABINET ID | CONTENTS ID | SERVER REPORT TIME |
|---|---|---|---|---|---|
| e00000 | 20030612151029 | buy | cab1844927 | – | 20030612151029 |
| e00001 | 20030612153810 | add | cab1844927 | cnt4397 | 20030612153810 |
| e00002 | 20030612153812 | add | cab1844927 | cnt1905 | 20030612153812 |
| e00003 | 20030613220847 | del | cab1844927 | cnt4397 | 20030613220958 |
| e00004 | 20030613221031 | add | cab1844927 | cnt5293 | 20030613221031 |
| e00005 | 20030614201053 | buy | cab1903944 | – | 20030614201053 |
| e00006 | 20030614201411 | add | cab1903944 | cnt5945 | 20030614201411 |

START → REFER TO CONTENTS DB (S301) → REFER TO CONTENTS STORAGE STATUS INFORMATION (S302) → GENERATE CONTENTS LIST (S303) → GENERATE CABINET INFORMATION (S304) → END

| CONTENTS ID | TITLE | ARTIST NAME | CATEGORY | RELEASE START TIME | RELEASE END TIME |
|---|---|---|---|---|---|
| : | : | : | : | : | : |
| cnt1904 | TITLE ABC | BandABC | JAZZ | 200304080000 | 200404080000 |
| cnt1905 | TITLE DEF | SoloDEF | J-POP | 200305010000 | 200405010000 |
| cnt1906 | TITLE GHI | OrchGHI | CLASSIC | 200306060000 | 200406060000 |
| cnt5945 | TITLE JKL | VA-JKL | LOUD | 200306150000 | 200406150000 |
| : | : | : | : | : | : |

FIG. 14

| CONTENTS ID | TITLE | ARTIST NAME | CATEGORY | OUT ON LOAN |
|---|---|---|---|---|
| cnt1904 | TITLE ABC | BandABC | JAZZ | |
| cnt1905 | TITLE DEF | SoloDEF | J-POP | ○ |
| cnt1906 | TITLE GHI | OrchGHI | CLASSIC | |
| cnt5945 | TITLE JKL | VA-JKL | LOUD | |
| : | : | : | : | : |

FIG. 15

| CONTENTS ID | CABINET ID |
|---|---|
| cnt1905 | cab1844927 |
| cnt5293 | cab1844927 |
| − | cab1903944 |
| − | cab1903944 |
| − | cab1903944 |
| − | cab1903944 |

# CONTENT DELIVERY METHOD, CONTENT DELIVERY SERVICE COMPUTER, CONTENT DELIVERY SERVICE SYSTEM, DATA DISCARD RECOGNITION METHOD, DATA DISCARD RECOGNITION COMPUTER, AND TERMINAL

TECHNICAL FIELD

The present invention relates to a contents distribution method for distributing contents by using a computer connected to a network, a contents distribution service system, a contents distribution service computer, and a terminal apparatus to which the contents are distributed.

Further, the present invention relates to a data discard recognition method for recognizing discard of electronic data held in a terminal apparatus by using a computer connected to a network, a data discard recognition computer, and a terminal apparatus in which the electronic data are held.

BACKGROUND ART

Distribution of contents can be received through a network easily. When distribution of contents needs to be received with a fee, it is favorable to a contents user that the contents user can use contents as many as possible at low cost. In addition, it is preferable that procedures for distribution and use of contents are as easy as possible.

Also on the contents provider side, there is a demand that contents distribution procedures should be as easy as possible. Particularly in contents distribution service with a fee, there is a demand that accounting procedures are as few as possible and as easy as possible.

Patent Document 1 has disclosed a flat-rate contents distribution system. In this system, a user makes a contract with a contents provider for a flat-rate rental limit in advance. The contents provider distributes contents to the user in accordance with the contracted limit. Although the user can use distributed contents within the term of contract, the user can delete unnecessary contents within the term of contract when the unnecessary contents are included in the contents distributed at the flat rate. In this case, the contracted fee is discounted at an amount corresponding to the deleted contents when information concerned with the deleted contents is transmitted to a contract management center.

Since this system is basically a limited time rental service system, management burdens imposed on the user and the service provider are large. That is, the user has to always manage distributed contents while paying attention to necessity of the distributed contents to avoid wasteful payment. In addition, the user has to always make a new rental contract by troublesome procedures to receive distribution of new contents. On the other hand, the processing burden imposed on the service provider is also large because the service provider has to make management of a rental limit and a fee in accordance with each contract whenever a contents deletion process or a subscription to new contents distribution is made, and the service provider has to make an expiration period management process periodically.

Patent Document 2 has disclosed a system for use of contents with a fee, in which a paid fee is returned in accordance with a period of service. For use of this system, a user pays a provisional fee to a provider when contents with a fee are distributed. When unnecessary contents with a fee are deleted by the user after use of the contents, the provider returns a part of the provisional fee to the user. This returned amount of money is determined in accordance with the period of use of the contents. When a predetermined period has lapsed, the contents are regarded as "purchased" because the rental fee is equal to a purchase fee.

Also in this system, the burden imposed on the user is large because the user has to use distributed contents while always paying attention to the necessity of the distributed contents. The burden imposed on the service provider for management processing is also large because the service provider has to manage the periods of use periodically in accordance with contents. In addition, the burden for processing to return the paid fee is large.

In these systems, a contracted charge fee is discounted or a paid fee is returned when the user deletes distributed contents to disable the contents from use. It is therefore essential to system operation that information indicating deletion of contents (disabling contents from use) is highly reliable. Although Patent Documents 1 and 2 have described the fact that information indicating deletion of contents is transmitted, it is possible to make a false statement.

As an example of outputting of a signal for warranting deletion of contents stored in a storage device of a computer, a contents operation management apparatus has been described in Patent Document 3. In this apparatus, another computer having received a notice of deletion of contents checks a hard disk storing the contents and confirms deletion of the contents. It is however impossible to apply this technique to confirmation of deletion of contents in a user terminal through a network.

Patent Document 1: JP-A-2001-195464
Patent Document 2: JP-A-2001-325234
Patent Document 3: JP-A-2003-242037

DISCLOSURE OF THE INVENTION

Problems that the Invention is to Solve

In consideration of the aforementioned circumstances, an object of the present invention is to provide a contents distribution method in which burdens imposed on both a distribution service provider and a contents user are lightened so that the contents user can use contents as many as possible at low cost, a contents distribution service system, a contents distribution service computer, and a terminal apparatus which can be used for such contents distribution.

In consideration of the aforementioned circumstances, another object of the present invention is to provide a data discard recognition method in which discard of electronic data in a terminal apparatus can be recognized easily and reliably, a data discard recognition computer, and a terminal apparatus for outputting information for such recognition of data discard.

Means for Solving the Problems

The contents distribution method according to the present invention is a contents distribution method for distributing contents by using a computer connected to a network, having: a usable limit generation step of generating a contents usable limit for each user terminal connectable to the network, in accordance with a contents usable limit generation request given from the user terminal; a contents distribution step of distributing contents to the user terminal in accordance with a contents distribution request given from the user terminal; a storage status management step of managing contents storage status information in the user terminal as management-side contents storage status information, the contents storage status information indicating the storage status of the contents distributed by the contents distribution step; and a status report reception step of receiving a contents storage status report including the contents storage status information in the user terminal, wherein: the storage status management step includes a storage status information update step of updating the management-side contents storage status information based on the contents storage status report received by the status report reception step; and the contents distribution step determines the remaining capacity of the contents usable limit based on information concerned with available contents and deleted contents, included in the management-side contents storage status information and distributes the contents within the remaining capacity in accordance with the contents distribution request.

According to the present invention, expiration period management on the service provider side can be dispensed with. In addition, automatic deletion of contents in the terminal receiving distribution of the contents can be dispensed with. That is, the user can return the contents by a simple operation of deleting the distributed contents when the contents are unnecessary, so that the user can receive distribution of new contents. Accordingly, burdens imposed on both the distribution service provider and the contents user are lightened so that the contents user can use contents as many as possible at low cost.

The contents distribution method according to the present invention includes a contents distribution method further having a storage status verification step of verifying the storage status of the contents in the user terminal based on the contents storage status report received by the status report reception step and the management-side contents storage status information, wherein the storage status information update step and the contents distribution step are executed when a result of verification by the storage status verification step is successful. According to the present invention, change of the contents on the terminal apparatus side can be confirmed surely.

The contents distribution method according to the present invention includes a contents distribution method wherein: the contents storage status report contains change history information indicating a change history of the storage status of the contents in the user terminal; and the storage status verification step includes a step of comparing contents storage status information obtained based on the change history information and the management-side contents storage status information with the contents storage status information contained in the contents storage status report.

The distribution method according to the present invention includes a contents distribution method wherein the change history information contained in the contents storage status report indicates a change history unreported from the user terminal.

The contents distribution method according to the present invention includes a contents distribution method wherein: the storage status management step also manages the change history of the contents storage status information in the user terminal as management-side change history information; the contents storage status report contains verification information obtained by applying a predetermined arithmetic operation to the contents storage status information and the change history information in the user terminal; and the storage status verification step includes a step of comparing the verification information contained in the contents storage status report with management-side verification information obtained by applying a predetermined arithmetic operation to the contents storage status information contained in the contents storage status report and the management-side change history information.

The contents distribution method according to the present invention includes a contents distribution method wherein the contents storage status information contains part of details of the contents in the user terminal.

The contents distribution method according to the present invention is a contents distribution method for distributing contents by using a computer connected to a network, having: a usable limit generation step of generating a contents usable limit for each user terminal connectable to the network, in accordance with a contents usable limit generation request given from the user terminal; a contents distribution step of distributing contents to the user terminal in accordance with a contents distribution request given from the user terminal; a contents use status management step of managing the contents usable limit generated by the usable limit generation step and the status of corresponding contents in the user terminal; and a deletion information reception step of receiving deletion information indicating deletion of the distributed contents in the user terminal, wherein the contents distribution step determines the remaining capacity of the contents usable limit based on information concerned with the contents distributed by the contents distribution step and information concerned with the contents whose deletion information is received by the deletion information reception step, and distributes the contents within the remaining capacity in accordance with the contents distribution request.

The contents distribution service computer according to the present invention is a contents distribution service computer for managing contents distribution through a network, having: a contents distribution instruction portion for giving an instruction to distribute contents to a user terminal connectable to the network in accordance with a contents distribution request given from the user terminal; a storage status management portion for managing contents storage status information as management-side contents storage status information, the contents storage status information indicating the storage status of contents in the user terminal; and a reception portion for receiving a contents storage status report containing the contents storage status information in the user terminal, from the user terminal, wherein: the storage status management portion has a storage status information update function for updating the management-side contents storage status information based on the contents storage status report; and the contents distribution instruction portion determines the remaining capacity of a contents usable limit in the user terminal based on information concerned with available contents and deleted contents contained in the management-side contents storage status information, and gives an instruction to distribute the contents within the remaining capacity in accordance with the contents distribution request.

The contents distribution service computer according to the present invention includes a contents distribution service computer further having a storage status verification portion for verifying the storage status of the contents in the user terminal based on the contents storage status report and the management-side contents storage status information, wherein: the storage status management portion updates the management-side contents storage status information when a result of verification by the storage status verification portion is successful; and the contents distribution instruction portion gives an instruction to distribute the contents when the result of verification by the storage status verification portion is successful.

The contents distribution service computer according to the present invention includes a contents distribution service computer wherein: the contents storage status report contains change history information indicating a change history of the storage status of the contents in the user terminal; and the storage status verification portion verifies the storage status of the contents by comparing the contents storage status information contained in the contents storage status report with contents storage status information obtained based on the change history information and the management-side contents storage status information.

The contents distribution service computer according to the present invention includes a contents distribution service computer wherein the change history information contained in the contents storage status report indicates a change history unreported from the user terminal.

The contents distribution service computer according to the present invention includes a contents distribution service computer wherein: the storage status management portion also manages the change history of the storage status of the contents in the user terminal as management-side change history information; the contents storage status report contains verification information obtained by applying a predetermined arithmetic operation to the contents storage status information and the change history information in the user terminal; and the storage status verification portion verifies the storage status of the contents by comparing the verification information contained in the contents storage status report with management-side verification information obtained by applying a predetermined arithmetic operation to the management-side contents storage status information and the management-side change history information.

The contents distribution service computer according to the present invention includes a contents distribution service computer wherein the contents storage status information contains part of details of the contents.

The contents distribution service system according to the present invention is a contents distribution service system for providing contents distribution service to user terminals by using a computer connected to a network, having: a contents database for storing contents to be subjected to the distribution service; a contents distribution server connected to the network and provided for distributing contents stored in the contents database to the user terminals; a management server connected to the network and provided for managing contents usable limits and contents storage statuses of all the user terminals; and an accounting server for performing an accounting process due to purchase of the contents usable limits, wherein: the management server has a usable limit generation function for generating a contents usable limit for each of the user terminals in accordance with a contents usable limit generation request given from the user terminal and instructing the accounting server to perform an accounting process, and a contents distribution instruction function for instructing the contents distribution server to distribute the contents in accordance with a contents distribution request given from the user terminal; and the management server determines the remaining capacity of the contents usable limit in the user terminal based on information concerned with available contents and deleted contents in the user terminal and gives an instruction to distribute the contents within the remaining capacity.

The terminal apparatus according to the present invention is a terminal apparatus for receiving distribution of contents through a network, having: a contents holding portion for storing distributed contents; a contents status holding portion for storing contents storage status information indicating the storage status of the distributed contents and change history information indicating a change history of the storage status of the contents; a status report generation portion for generating a contents storage status report containing the contents storage status information; a status report output portion for outputting the contents storage status report generated by the status report generation portion; and a contents status change portion for changing the storage status of the contents, inclusive of deletion of contents, stored in the contents holding portion.

The terminal apparatus according to the present invention includes the status report generation portion which generates a contents storage status report containing the change history information.

The terminal apparatus according to the present invention includes the change history information that is the change history information which has been not output from the status report output portion.

The terminal apparatus according to the present invention includes the status report generation portion which generates verification information obtained by applying a predetermined arithmetic operation to the contents storage status information and the change history information; and the status report output portion which outputs the contents storage status report containing the verification information.

In the terminal apparatus according to the present invention, the contents storage status information contains part of details of the contents.

The contents distribution program according to the present invention is a contents distribution program for making a computer execute respective steps of the contents distribution method.

The contents distribution service program according to the present invention is a contents distribution service program for implementing the contents distribution instruction portion, the storage status management portion and the transmission/reception portion in the contents distribution service computer.

The contents distribution service program according to the present invention is a contents distribution service program for implementing the contents distribution instruction portion, the storage status management portion, the transmission/reception portion and the storage status verification portion in the contents distribution service computer.

The terminal program according to the present invention is a terminal program for making a computer implement the status report generation portion, the status report output portion and the contents status change portion in the terminal apparatus.

The data discard recognition method according to the present invention is a data discard recognition method for recognizing discard of electronic data held in each terminal apparatus by using a computer connected to a network, having: a status management step of managing status information as management-side status information in accordance with the terminal apparatus, the status information indicating the storage status of the electronic data in the terminal apparatus; and a status report reception step of receiving a status report based on the status information from the terminal apparatus, wherein the status management step includes: a status update step of updating the management-side status information based on the status report; and a status check step of comparing the management-side status information with the status information contained in the status report to thereby judge whether the electronic data are discarded or not. According to the present invention, discard of electronic data in the terminal apparatus can be recognized easily and reliably.

The data discard recognition method according to the present invention includes a data discard recognition method wherein: the status information at least contains identification information of the electronic data, data discard information indicating discard of the electronic data, and storage place information of the electronic data in the terminal apparatus; and the status check step makes a decision that the data discard information is valid, when the identification information of the electronic data and the storage place information contained in the status report are coincident with the identification information and the storage place information contained in the management-side status information.

The data discard recognition method according to the present invention includes a data discard recognition method wherein: the status information contains part of details of the electronic data held in the terminal apparatus; and the status check step makes a decision that the electronic data are discarded, when the data discard information contained in the status report indicates discard of the electronic data and part of the details of the electronic data contained in the status report is not coincident with part of the details of the electronic data contained in the management-side status information.

The data discard recognition method according to the present invention includes a data discard recognition method wherein: the status report at the time of storage of the electronic data in the terminal apparatus contains the status information at the time of storage of the electronic data; the status report after discard of the electronic data in the terminal apparatus contains discard indication information obtained by applying a predetermined arithmetic operation to at least part of the status information after discard of the electronic data; and the status check step compares the discard indication information contained in the status report with management-side judgment information obtained by applying a predetermined arithmetic operation to at least part of the management-side status information, and makes a decision that the electronic data are discarded, when the discard indication information and the management-side judgment information are coincident with each other.

The data discard recognition method according to the present invention includes a data discard recognition method wherein: the electronic data are contents distributed through the network; and the status information is contents storage status information indicating the storage status of the contents. According to the present invention, discard of contents distributed to the terminal apparatus can be recognized easily and reliably, so that the processing burden for management of the contents distribution service can be lightened.

The data discard recognition computer according to the present invention is a data discard recognition computer for recognizing discard of electronic data held in each of terminal apparatuses through a network, having: a status management portion for managing status information as management-side status information in accordance with the terminal apparatus, the status information indicating the storage status of the electronic data in the terminal apparatus; and a reception portion for receiving a status report based on the status information from the terminal apparatus, wherein the status management portion has a status update function of updating the management-side status information based on the status report, and a status check function of comparing the management-side status information with the status information contained in the status report to thereby judge whether the electronic data are discarded or not.

The data discard recognition computer according to the present invention includes a data discard recognition computer wherein: the status information at least contains identification information of the electronic data, data discard information indicating discard of the electronic data, and storage place information of the electronic data in the terminal apparatus; and the status check function makes a decision that the data discard information is valid, when the identification information of the electronic data and the storage place information contained in the status report are coincident with the identification information and the storage place information contained in the management-side status information.

The data discard recognition computer according to the present invention includes a data discard recognition computer wherein: the status information contains part of details of the electronic data held in the terminal apparatus; and the status check function makes a decision that the electronic data are discarded, when the data discard information contained in the status report indicates discard of the electronic data and part of the details of the electronic data contained in the status report is not coincident with part of the details of the electronic data contained in the management-side status information.

The data discard recognition computer according to the present invention includes a data discard recognition computer wherein: the status report at the time of storage of the electronic data in the terminal apparatus contains the status information at the time of storage of the electronic data; the status report after discard of the electronic data in the terminal apparatus contains discard indication information obtained by applying a predetermined arithmetic operation to at least part of the status information after discard of the electronic data; and the status check function compares the discard indication information contained in the status report with management-side judgment information obtained by applying a predetermined arithmetic operation to at least part of the management-side status information, and makes a decision that the electronic data are discarded, when the discard indication information and the management-side judgment information are coincident with each other.

The data discard recognition computer according to the present invention includes a data discard recognition computer wherein: the electronic data are contents distributed through the network; and the status information is contents storage status information indicating the storage status of the contents.

The terminal apparatus according to the present invention is a terminal apparatus for holding electronic data, having: a status holding portion for storing status information indicating the storage status of the electronic data; a status report generation portion for generating a status report based on the status information; a status report output portion for outputting the status report generated by the status report generation portion; and a status change portion for changing the storage status of the electronic data inclusive of discard of the electronic data, wherein the status information at least contains identification information of the electronic data, data discard information indicating discard of the electronic data, and storage place information of the electronic data.

In the terminal apparatus according to the present invention, the status information contains part of details of the electronic data.

In the terminal apparatus according to the present invention, the status report at the time of storage of the electronic data contains the status information at the time of storage of the electronic data; and the status report after discard of the electronic data contains discard indication information obtained by applying a predetermined arithmetic operation to at least part of the status information after discard of the electronic data.

In the terminal apparatus according to the present invention, the electronic data are contents distributed through the network; and the status information is contents storage status information indicating the storage status of the contents.

The data discard recognition program according to the present invention is a data discard recognition program for making a computer execute respective steps of the data discard recognition method.

The program according to the present invention is a contents distribution service program for implementing the status management portion and the reception portion in the data discard recognition computer.

The terminal program according to the present invention is a terminal program for making a computer implement the status report generation portion, the status report output portion and the status change portion in the terminal apparatus.

Effect of the Invention

The portions described herein can be implemented as a processor provided with a memory storing computer-executable instructions that, when executed by the processor, perform the functions described herein for the respective portions.

As is apparent from the above description, the present invention can provide a contents distribution method in which burdens imposed on both a distribution service provider and a contents user are lightened so that the contents user can use contents as many as possible at low cost, a contents distribution service system, a contents distribution service computer, and a terminal apparatus which can be used for such contents distribution.

Further, the present invention can provide a data discard recognition method in which discard of electronic data in a terminal apparatus can be recognized easily and reliably, a data discard recognition computer, and a terminal apparatus for outputting information for such recognition of data discard.

BRIEF DESCRIPTION OF THE DRAWINGS

FIG. 2 A table showing an example of contents storage status information in the contents distribution system for explaining the first embodiment of the present invention.

FIG. 3 A table showing an example of change history information in the contents distribution system for explaining the first embodiment of the present invention.

FIG. 5 A view conceptually showing an example of a contents storage status report in the contents distribution system for explaining the first embodiment of the present invention.

FIG. 6 A view showing transmission data of an example of the contents storage status report in the contents distribution system for explaining the first embodiment of the present invention.

FIG. 8 A view showing an example of a verification number management table in the contents distribution system for explaining the first embodiment of the present invention.

FIG. 9 A table showing an example of management-side contents storage status information in the contents distribution system for explaining the first embodiment of the present invention.

FIG. 10 A table showing an example of management-side change history information in the contents distribution system for explaining the first embodiment of the present invention.

FIG. 14 A view showing an example of an openable contents list in the contents distribution system for explaining the first embodiment of the present invention.

FIG. 15 A table showing an example of cabinet information in the contents distribution system for explaining the first embodiment of the present invention.

DESCRIPTION OF REFERENCE NUMERALS

Figure 1:
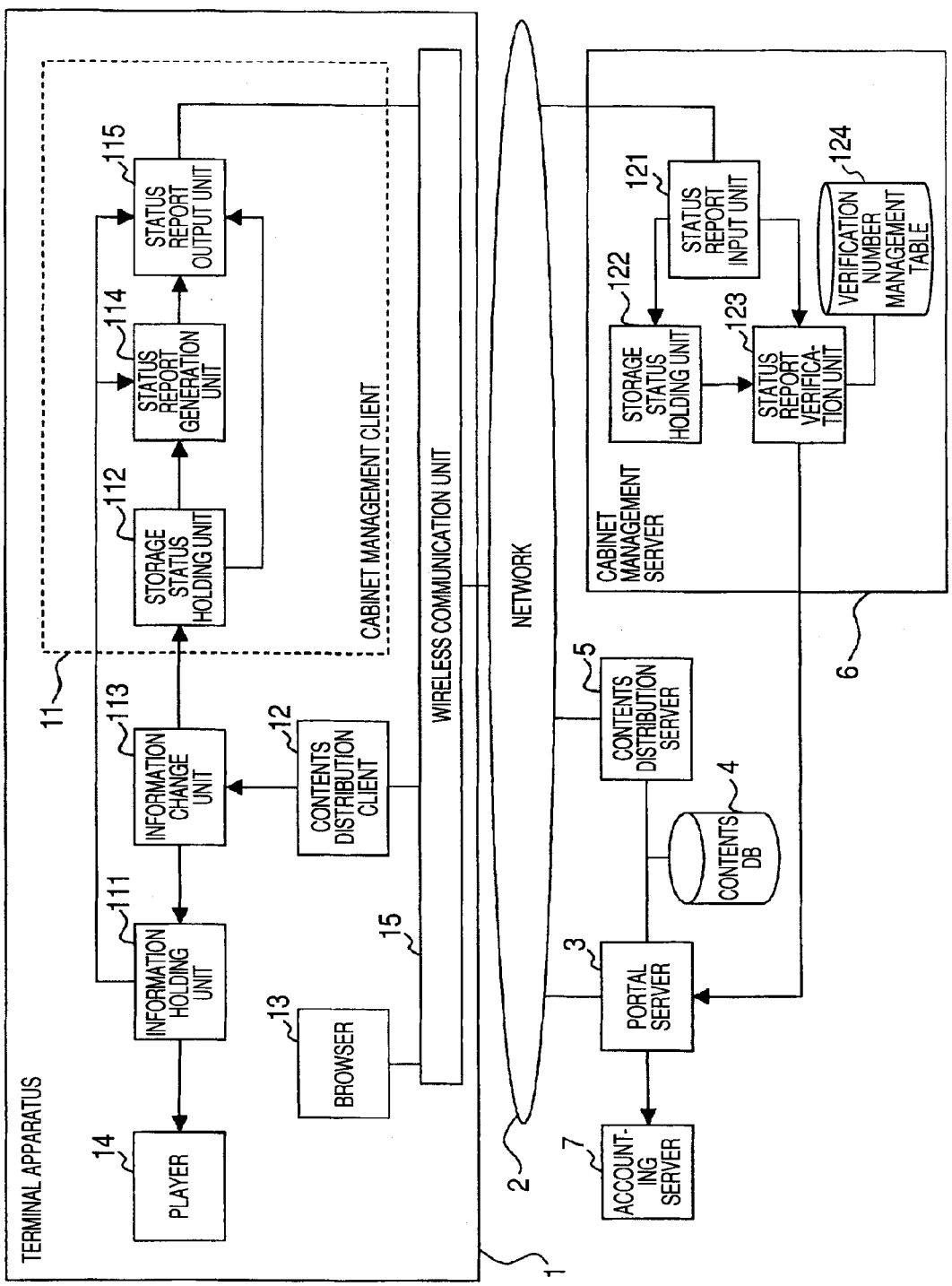
FIG. 1 A diagram showing a schematic configuration of a contents distribution system for explaining a first embodiment of the present invention.

1 . . . terminal apparatus
2 . . . network
3 . . . portal server
4 . . . contents database
5 . . . contents distribution server
6 . . . cabinet management server
7 . . . accounting server
11 . . . cabinet management client
12 . . . contents distribution client
13 . . . browser
14 . . . player
15 . . . wireless communication unit
111 . . . information holding unit
112 . . . storage status holding unit
113 . . . information change unit
114 . . . status report generation unit
115 . . . status report output unit
121 . . . status report input unit
122 . . . storage status holding unit
123 . . . status report verification unit
124 . . . verification number management table.

BEST MODE FOR CARRYING OUT THE INVENTION

Embodiments of the present invention will be described below with reference to the drawings. Although the following description will be made in the case where contents distributed to a terminal apparatus through a network are electronic data requiring recognition of discarded data, license data for using the contents may be used instead of the contents per se. Moreover, the contents are not limited to electronic data distributed through a network.

First Embodiment

FIG. 1 shows a schematic configuration of a contents distribution system for explaining an embodiment of the present invention. The contents distribution system in FIG. 1 includes a terminal apparatus 1, a portal server 3, a contents database (hereinafter referred to as "contents DB" simply) 4, a contents distribution server 5, a cabinet management server 6, and an accounting server 7. The terminal apparatus 1, the portal server 3, the contents distribution server 5 and the cabinet management server 6 are connected to a network 2 such as the Internet, etc.

Although FIG. 1 shows only one terminal apparatus 1, a larger number of terminal apparatuses are connected actually. Moreover, although description is made on the case where the portal server 3, the contents distribution server 5 and the cabinet management server 6 are constituted by computers respectively, any two or all of these servers may be implemented by one computer.

The contents DB 4 stores contents to be distributed to the terminal apparatus 1 through the network 2 and information attached to the contents. The information attached to the contents includes contents name, artist name, price (estimated value), contents size, etc.

The portal server 3 provides entrance information concerned with contents distribution service, that is, a portal page. This portal page includes a list of available contents in the contents stored in the contents DB 4, and information concerned with the contents distribution service (such as description of details of the service, news, artist information, links to tie-up sites, and advertisement). When procedures for reception of contents distribution or procedures for purchase of a contents usable limit (hereinafter referred to as "cabinet") as a limit for reception of contents distribution are made, the portal server 3 exchanges necessary information with the terminal apparatus 1. Further, the portal server 3 sends a notice of information about users of the provided contents distribution service and sales to the accounting server to request the accounting server to collect bills.

The accounting server 7 performs a process of collection of bills caused by use of the contents distribution service. Specifically, when a cabinet which will be described later is purchased, the accounting server 7 performs an accounting process to collect a bill for the purchased cabinet on the basis of an instruction given from the portal server 3. Various methods such as credit card payment, etc. are known as the bill collection method, so that description thereof will be omitted here.

Upon reception of a request from the portal server 3, the contents distribution server 5 cooperates with a contents distribution client 12 of the terminal apparatus 1 to distribute contents stored in the contents DB 4 to the terminal. The contents to be distributed are contents distribution of which is requested by the terminal apparatus 1.

The cabinet management server 6 manages the status of the cabinet in the terminal apparatus 1 and the storage status of the distributed contents corresponding to the cabinet. At the same time, the cabinet management server 6 verifies the storage status of the contents in the terminal apparatus 1.

The cabinet management server 6 includes a status report input unit 121, a storage status holding unit 122, a status report verification unit 123, and a verification number management table 124. The storage status holding unit 122 holds information of the cabinet held by the terminal apparatus 1, i.e. contents storage status information indicating the storage status of the contents, as management-side contents storage status information. The status report input unit 121 receives a contents storage status report from a status report output unit 115 of the terminal apparatus 1. The status report verification unit 123 verifies whether the received contents storage status report is correct or not. The verification number management table 124 stores a verification number generated when a result of the verification process is correct, together with a validated date of the verification number. The storage status holding unit 122 generates and updates the management-side contents storage status information based on the contents storage status report received from the status report output unit 115. The management-side contents storage status information is updated when the result of verification by the status report verification unit 123 is correct.

Upon reception of a cabinet purchase request from the terminal apparatus 1, the cabinet management server 6 generates a cabinet corresponding to the requesting terminal apparatus and gives an instruction to the accounting server through the portal server 3 to perform an accounting process. In addition, the portal server 3 gives an instruction to the contents distribution server 5 to distribute contents in accordance with a contents distribution request from the terminal apparatus 1. On that occasion, a result of verification by the status report verification unit 123 is judged while the verification number management table 124 is referred to. Only when the verification result is successful, an instruction to distribute the contents is given. Moreover, the remaining capacity of the cabinet in the terminal apparatus 1 is determined based on information about available contents and deleted contents in the terminal apparatus 1, and an instruction to distribute the contents within the remaining capacity is given.

In this manner, the portable server 3 and the cabinet management server 6 cooperate with each other to manage the contents distribution service. Incidentally, as described above, the portal server 3 and the cabinet management server 6 may be implemented by one computer.

The terminal apparatus 1 is a user terminal used by a user receiving the contents distribution service. For example, the terminal apparatus 1 is a portable wireless terminal. The terminal apparatus 1 includes a cabinet management client 11, a contents distribution client 12, a browser 13, a player 14, a wireless communication unit 15, an information holding unit 111, and an information change unit 113. These unit are implemented chiefly by a computer executing predetermined programs. Distributed system management programs for reception of the contents distribution service are received and installed before use of the service.

The cabinet management client 11 manages the status of the cabinet in the terminal apparatus 1. The cabinet management client 11 includes a storage status holding unit 112, a status report generation unit 114, and a status report output unit 115. The storage status holding unit 112 stores the contents storage status information indicating the storage status of distributed contents in the terminal apparatus 1, and change history information indicating a change history of the contents storage status. The status report generation unit 114 generates a contents storage status report including the contents storage status information. The status report output unit 115 outputs the generated contents storage status report to the status report input unit of the cabinet management server 6. Exchange of information between the terminal apparatus 1 and each of the portal server 3, the contents distribution server 5 and the cabinet management server 6 is performed through the wireless communication unit 15 and the network 2.

The contents distribution client 12 cooperates with the contents distribution server 5 to download contents on the contents DB 4. The downloaded contents are stored in the information holding unit 111 through the information change unit 113.

The browser 13 is a user interface when the user uses the terminal apparatus 1 to distribute contents, make use of distributed contents, etc. Specifically, the browser 13 performs a process for inquiring of the cabinet management client 11 and acquiring and displaying the status of the cabinet, a process for acquiring and displaying a list of distributable contents from the portal server 3, a process for providing a GUI in data exchange with the portal server 3 for procedures of contents distribution or cabinet purchase, etc. Further, the browser 13 performs a process for starting the contents distribution client 12 when distribution of contents is performed.

The player 14 plays back contents (video, audio, animation, etc.) stored in the information holding unit 111. The wireless communication unit 15 controls wireless communication in the terminal apparatus 1 through the network 2.

The information holding unit 111 holds distributed contents. The information change unit 113 changes the status of contents held by the information holding unit 111. When the status of contents is changed, the information change unit 113 sends a notice of details of the change to the storage status holding unit 112. Change of the status of contents includes new storage, and rewriting.

FIG. 2 shows an example of contents storage status information held in the storage status holding unit 112 of the cabinet management client 11. The contents storage status information shown in FIG. 2 contains contents identification information (contents ID), cabinet identification information (cabinet ID), status, contents storage path, and contents details, which are managed based on information numbers in accordance with distributed contents respectively. A new entry for the contents storage status information is generated whenever contents are distributed. Incidentally, identification information (ID) is given to the contents storage status information in accordance with each terminal apparatus ("C87911" is given in FIG. 2), so that the cabinet management server 6 manages the contents storage status information based on the ID.

The contents ID is identification information given to contents subjected to distribution service. The cabinet ID is identification information given to each cabinet used for distribution of contents. The status is information indicating the status of distributed contents. The term "available" indicates that the contents can be used in the terminal apparatus 1. The term "deleted" indicates that the contents have been deleted and disabled from use. The contents storage path indicates an address of storage of the contents. The contents details indicate binary data as part of the contents held in the information holding unit 111.

Incidentally, deletion such as discard of contents is performed by an operation of rewriting at least part of data of the contents, so that the contents are disabled from use.

FIG. 3 shows an example of change history information held in the storage status holding unit 112 of the cabinet management client 11. Each contents change history shown in FIG. 3 contains change time, change kind, cabinet ID, contents ID, and server report time, which are managed based on each change number in the change history. A new entry for the change history information is generated whenever a cabinet is purchased, contents are distributed, or contents are deleted. Incidentally, identification information (ID) is given to the change history information in accordance with each terminal apparatus ("H28719" is given in FIG. 2), so that the cabinet management server 6 manages the change history information based on the ID.

The change time indicates a time at which the storage status of the contents (the status of the cabinet) was changed. For example, "20030612151029" indicates 2003/6/12 15:10:29. The change kind indicates any one of cabinet purchase, contents distribution and contents deletion. The term "buy" indicates purchase of a cabinet. The term "add" indicates distribution of contents. The term "del" indicates deletion of contents. The cabinet ID and the contents ID are the same as those described in FIG. 2.

The server report time indicates a time at which the change history information of the change number was reported to the cabinet management server 6. In the example of FIG. 3, the server report time is not held in the change history information of change number "e00007". This indicates that the status of contents was changed in the terminal apparatus 1 but unreported to the cabinet management server 6. That is, the change history information of the change number "e00007" indicates that contents with contents ID "cnt5945" held in a cabinet with cabinet ID "cab1903944" were deleted at 2003/6/15 19:53:22 but history information of the contents was unreported to the cabinet management server 6.

As described above, contents storage status information indicating the status of contents corresponding to a cabinet, and change history information indicating change of distributed contents such as new storage or deletion and purchase of a cabinet are stored in the storage status holding unit 112.

Contents storage status information and change history information the same as those in each terminal apparatus are held as management-side contents storage status information and management-side change history information in the storage status holding unit 122 of the cabinet management server 6. Generation of the management-side contents storage status information and the management-side change history information will be described later.

Next, a contents storage status report generation process carried out by the status report generation unit 114 of the cabinet management client 11 will be described. The status report generation unit 114 generates a contents storage status report by use of the contents storage status information and the change history information.

Figure 4:
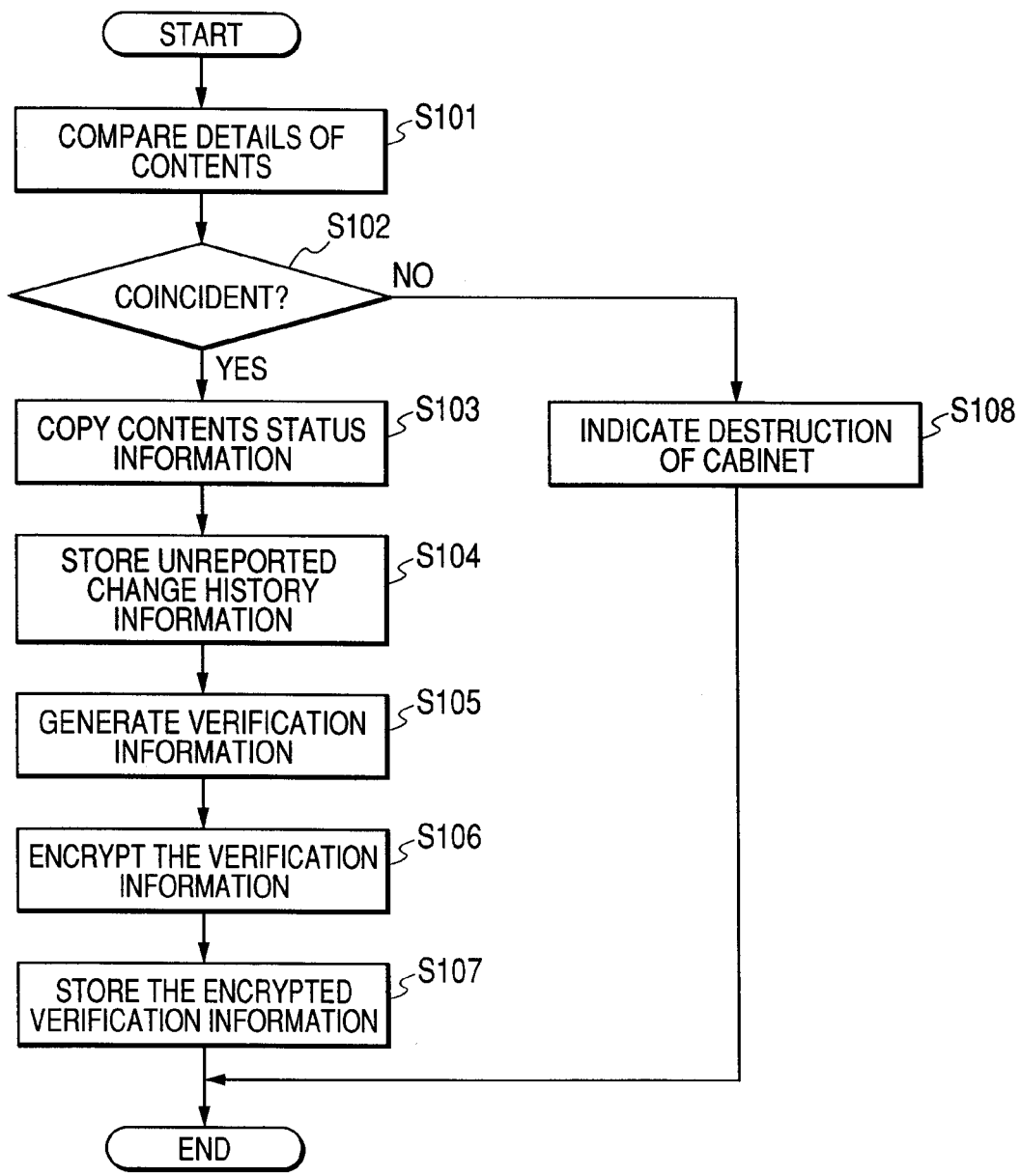
FIG. 4 A flow chart showing the outline of a contents storage status report generation process in the contents distribution system for explaining the first embodiment of the present invention.

FIG. 4 shows a flow chart of the outline of the contents storage status report generation process. In step S101, the details of contents held in the information holding unit 111 are compared with the details of contents contained in the contents storage status information (see FIG. 2). This step is performed for confirming that the details of the contents storage status information are normal (not destroyed). When judgment in step S102 concludes that a result of the comparison is not coincident, a notice indicating destruction of the cabinet is sent (step S108) and the routine of processing is terminated. In the case where the cabinet is destroyed, the contents storage status information is acquired from the cabinet management server 6 to repair the cabinet. In the case where deletion of contents is performed, the contents are rewritten with random data but the file indicated by the contents storage path is not allowed to be accessed after that in accordance with circumstances. In that case, the deleted contents may be freed from comparison of details of contents because the details of the contents are not coincident in terms of the deleted contents.

In the case where the details of the contents are coincident, the contents storage status information is copied and stored in a status report storage area (ensured in a work memory not shown) in step S103. Next, it is checked in step S104 whether there is unreported change history information or not, while the change history information (see FIG. 3) is referred to. When there is indeed unreported change history information, this information is stored in the status report storage area. Whether the change history information is reported to the cabinet management server 6 or not is judged based on whether the server report time of the change history information is stored or not, as described above.

In step S105, a predetermined arithmetic operation is performed on the stored contents storage status information and the stored change history information to thereby generate verification information. As the arithmetic operation used for generation of the verification information, for example, a hashing operation can be used. The hashing operation may be performed on the whole or part of the stored contents storage status information and the stored change history information. The verification information generated thus is encrypted with a secret key of the terminal apparatus 1 (step S106) and stored in the status report storage area (step S107). Incidentally, information concerned with the kind of the arithmetic operation and the subject of the arithmetic operation may be obtained in advance when system management programs are distributed.

FIGS. 5 and 6 show an example of the generated contents storage status report. In this example, the contents storage status report is generated by use of the contents storage status information in FIG. 2 and the change history information in FIG. 3. In FIG. 5, the contents storage status report is conceptually shown. In FIG. 6, data to be transmitted are shown.

In FIG. 5(*a*), the contents storage status information shown in FIG. 2 is stored as it is. In FIG. 5(*b*), only the change history information of the change number "e0007" in the change history information shown in FIG. 3 is stored. FIG. 5(*c*) shows the encrypted verification information generated in step S107 of FIG. 4. Incidentally, in FIG. 5, the contents storage status information and the change history information partially omitted are described.

In FIG. 6, the contents storage status report shown in FIG. 5 is expressed by tagged text data. A portion 601 corresponds to the change history information of the change number "e0007". A portion 602 corresponds to the contents storage status information. A portion 603 corresponds to the encrypted verification information.

Incidentally, although the above description has been given to the case where change history information included in a contents storage status report is regarded as unreported change history information, not only unreported change history information but also reported change history information may be included in a contents storage status report.

Next, a contents storage status report verification process carried out by the status report verification unit 123 of the cabinet management server 6 will be described. The status report verification unit 123 verifies an input contents storage status report by use of the contents storage status report input through the status report input unit 121 and the management-side contents storage status information and the management-side change history information held in the storage status holding unit 122.

Figure 7:
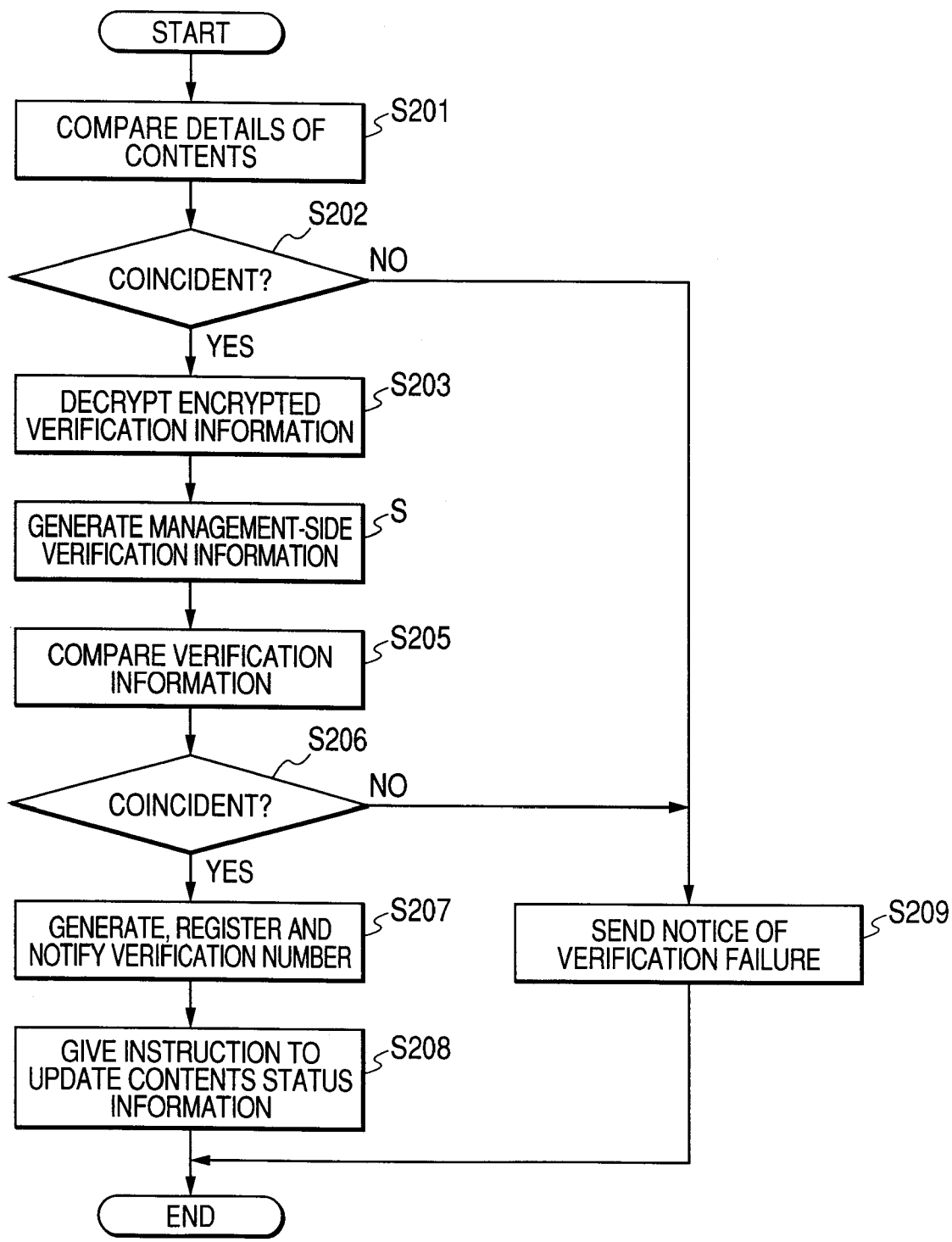
FIG. 7 A flow chart showing the outline of a contents storage status report verification process in the contents distribution system for explaining the first embodiment of the present invention.

FIG. 7 shows a flow chart of the outline of the contents storage status report verification process. In step S201, the status of contents included in the management-side contents storage status information held in the storage status holding unit 122 and the status of contents included in contents storage status information of the input contents storage status report are compared with each other. As will be described later, the management-side contents storage status information is made coincident with the contents storage status information of the terminal apparatus 1 at that time when a previous contents storage status report is input. Thus, the management-side contents storage status information should be coincident with the contents storage status information of the terminal apparatus 1 except the contents included in the input change history information. Accordingly, in this step, judgment is made as to whether all the items in terms of the contents except the contents included in the input change history information are coincident or not. In addition, judgment is made as to whether items of the contents included in the input change history information, except items "status" and "contents detail", are coincident or not, because contents whose "status" is "deleted" are contents newly deleted in the terminal apparatus 1.

When judgment in step S202 concludes that a result of the comparison is not coincident, it is decided that the verification fails. Then, a notice indicating the verification failure is sent in step S209, and the routine of processing is terminated. Accordingly, even if contents whose "status" is "deleted" are included in the contents in the change history information, judgment does not conclude that the contents are deleted. An operation in the case of a verification failure will be described later.

When the details of the contents are coincident with each other, the encrypted verification information included in the contents storage status report is decrypted in step S203. Decryption is performed with a public key of the terminal apparatus 1.

The public key of the terminal apparatus 1 is obtained in advance when a contract for the contents distribution service is made.

In step S204, management-side verification information is generated by use of the input contents storage status report and the management-side change history information held in the storage status holding unit 122. Specifically, the management-side verification information is generated by adding the input change history information to the management-side change history information and applying an arithmetic operation such as a hashing operation to the management-side change history information and the input contents storage status information. In step S205, the generated management-side verification information and the decrypted verification information are compared with each other.

When judgment in step S206 concludes that a result of the comparison is not coincident, it is decided that the verification fails. Then, a notice indicating the verification failure is sent in step S209 and the routine of processing is terminated.

When judgment in step S206 concludes that a result of the comparison is coincident, it is decided that the verification succeeds. Then, a verification number is generated and registered in the verification number management table 124, and the generated verification number is notified. The verification number is used in a contents distribution process which will be carried out then.

FIG. 8 shows an example of the verification number management table 124. Registration time and valid period of each verification number are registered in the verification number table 124 in accordance with the verification numbers. In this example, the valid period is set at one hour. For example, verification number "ver81945271" indicates that the verification number "ver81945271" is registered at 2003/06/15 23:18:42 and valid up to 2003/06/16 00:18:42.

When it is decided that the verification succeeds, an instruction to update the contents status information held in the storage status holding unit 122, i.e. the management-side contents storage status information and the management-side change history information are given to the storage status holding unit 122 (step S208) and the routine of processing is terminated.

Specifically, consider the case where the contents storage status report shown in FIG. 5 is input in the condition that management-side contents storage status information shown in FIG. 9 and management-side change history information shown in FIG. 10 are stored in the storage status holding unit 122. In step S201, the details of contents except the contents whose ID is "cnt5945" and which are designated by the change history information of the input change number "e0007" are compared with each other. Since a result of the comparison is coincident, processing of the step S203 et seq. is carried out.

Change history information obtained by adding the change history information of the input change number "e0007" to the management-side change history information shown in FIG. 10 and the input contents storage status information are used for generation of the management-side verification information in step S204. Accordingly, the generated management-side verification information is coincident with the decrypted verification information, so that it is decided that the verification succeeds.

Since judgment concludes that the verification succeeds, the management-side contents storage status information held in the storage status holding unit 122 is updated by the input contents storage status information. Information the same as that in shown in FIG. 2 is stored as the management-side contents storage status information. The change history information of change number "e0007" is added to the management-side change history information held in the storage status holding unit 122 so that the same information as that shown in FIG. 3 is stored as the management-side change history information.

As described above, the contents storage status report containing the contents status information and the change history information stored in the terminal apparatus 1 is received by the cabinet management server 6. Verification is performed by use of the management-side contents storage status information and the management-side change history information managed by the cabinet management server 6 and the received contents storage status report, so that the management-side contents storage status information and the management-side change history information are updated in accordance with a result of the verification. Accordingly, change in the status of contents on the terminal apparatus side can be grasped surely. Moreover, when verification information obtained by an arithmetic operation such as a hashing operation and added to the contents storage status report is compared with management-side verification information obtained from another data by the cabinet management server 6, change in the status of contents on the terminal apparatus side can be grasped more surely.

When contents are deleted, for example, as shown in this example, change in the contents storage status information can be recognized surely so that decision can be made that the contents are deleted. Even if there is a contents storage status report indicating false contents deletion, it is possible to surely detect this false report, because at least part of the contents are included in the contents storage status information. That is, even if there is a contents storage status report including information indicating deletion of contents in spite of the fact that the details of contents are not changed, it is possible to detect that the report is false.

Accordingly, as will be described later, decision can be made that there is a free space in the cabinet correspondingly to the deleted contents so that new contents can be distributed to the same cabinet. As described above, in the system in FIG. 1, the server side (cabinet management server 6 and the portal server 3) can recognize deletion (such as discarding) of contents which are electronic data held in the terminal apparatus 1, by use of the contents storage status information which is status information indicating the storage status of the electronic data.

Figure 11:
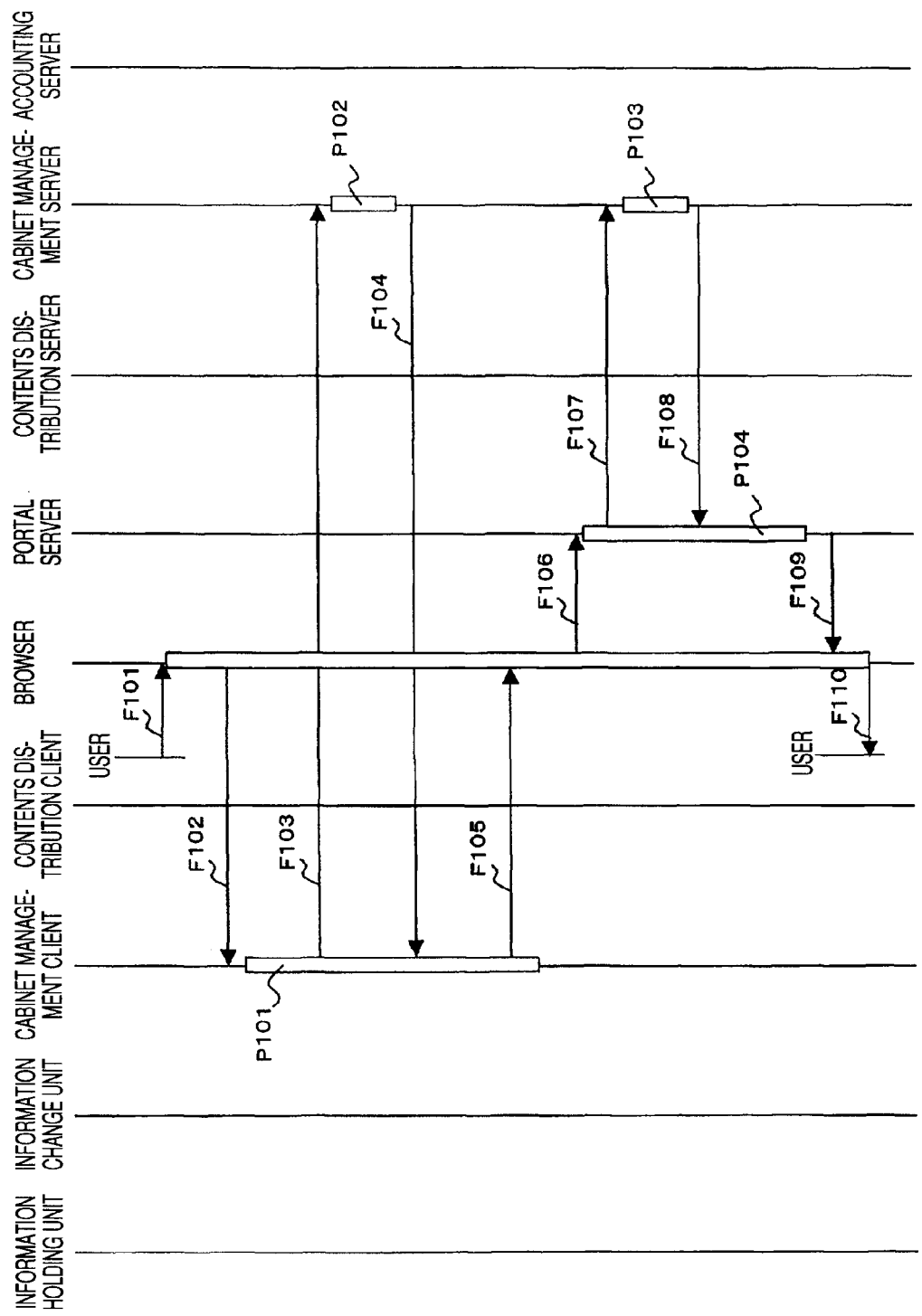
FIG. 11 A view showing operations for browsing various kinds of information for the contents distribution service in the contents distribution system for explaining the first embodiment of the present invention.

Next, operations for receiving distribution of contents by means of the contents distribution system shown in FIG. 1 will be described. In FIG. 11, operations for browsing various kinds of information for the contents distribution service are shown. Here, assume that a contract for receiving provision of the service (a notice of an accounting method, etc.) is made, the predetermined system management programs are installed in the terminal apparatus 1, at least one cabinet is purchased, and an area for storing contents storage status information and change history information is ensured in the storage status holding unit 112.

To browse various kinds of information for the contents distribution service, a user inputs a rental page browse request F101 to the browser 13. Specifically, the user performs this input by an operation of inputting a URL indicating the rental page. Upon reception of the rental page browse request F101, the browse 13 transmits a status report transmission request F102 to the cabinet management client 6.

Upon reception of the status report transmission request F102, the cabinet management client 6 generates a contents storage status report (P101). The contents storage status report is generated in the procedure shown in FIG. 4 so that the generated contents storage status report F103 is transmitted to the cabinet management server 6. By use of the received contents storage status report F103, a status report verification process is performed by the cabinet management server 6 (P102). The status report verification process is carried out in the procedure shown in FIG. 7 so that a verification result F104 is transmitted to the cabinet management client 11 and the cabinet management client 11 transmits a verification result F105 to the browser 13. When the verification result succeeds, a verification number is transmitted together with the verification results F104 and F105.

Figure 27:
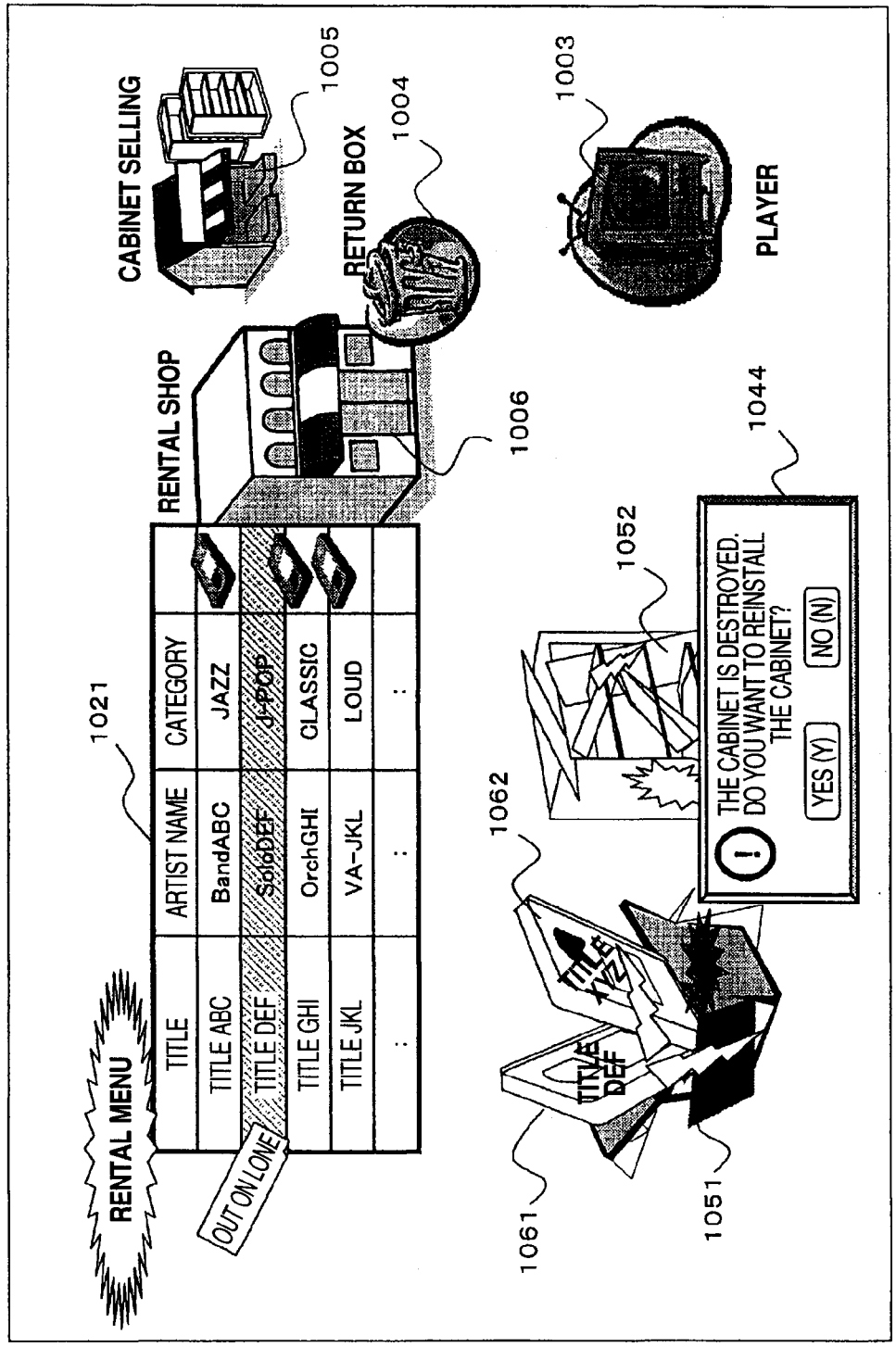
FIG. 27 A view showing a display screen example of the browser when verification fails in the contents distribution system for explaining the first embodiment of the present invention.

When the verification result is a verification failure, the browser 13 displays a screen shown in FIG. 27 and the routine of processing is terminated. The screen of FIG. 27 will be described later.

When the verification result is a verification success, the browser 13 transmits a rental page request F106 to the portal server 3. On this occasion, the verification number is also sent. Upon reception of the rental page request F106, the portal server 3 transmits a contents status request F107 together with the verification number to the cabinet management server 6. Upon reception of the contents status request F107, the cabinet management server 6 confirms the received verification number (P103). When the verification number can be confirmed, the cabinet management server 6 sends a contents status notice F108 together with a result of the confirmation. Management-side contents storage status information and management-side change history information stored in the storage status holding unit 122 are included in the contents status notice. The verification number confirmation process (P103) is performed by checking whether the confirmation time has gone beyond the valid period of the verification number while referring to the verification number management table 124. When the confirmation time has gone beyond the valid period, it is necessary to generate, transmit and verify the contents storage status report again.

Upon reception of the contents status notice F108, the portal server 3 generates distributable (rentable) contents list information and cabinet information (P104).

Figures 12, 13:
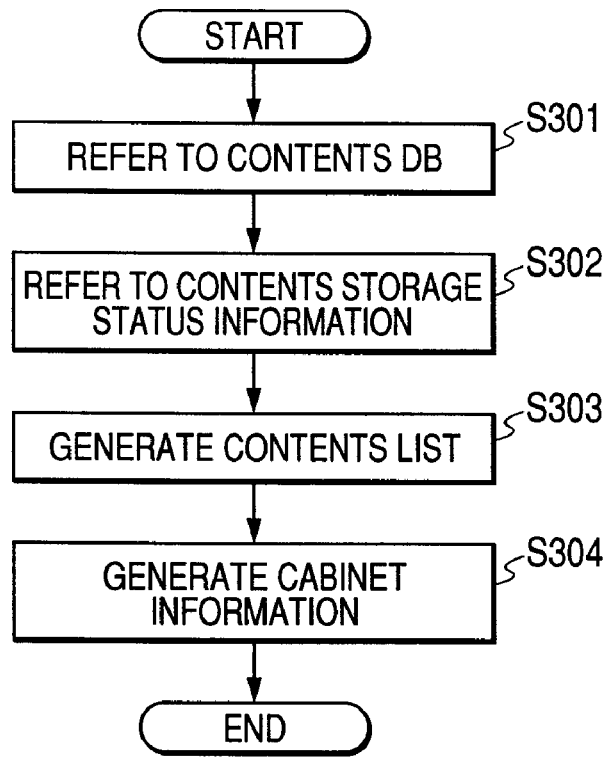
FIG. 12 A flow chart showing the outline of a list information and cabinet information generation process in the contents distribution system for explaining the first embodiment of the present invention.
FIG. 13 A view showing an example of a contents information table in the contents distribution system for explaining the first embodiment of the present invention.

FIG. 12 shows a flow chart of the outline of operations for the list information and cabinet information generation process. In step S301, openable contents are extracted while the contents DB 4 is referred to. FIG. 13 shows an example of a contents information table provided in the contents DB. As shown in FIG. 13, release start time information and release end time information, as well as information about contents title, artist name indicating contents producer and contents category, are associated with contents IDs and stored in the contents information table.

In step S302, the management-side contents storage status information transmitted from the cabinet management server 6 is referred to and compared with the list of openable contents so that currently open contents are extracted. In step S303, an openable contents list specified by identification of currently open contents is generated. FIG. 14 shows an example of the openable contents list.

As shown in FIG. 14, contents whose contents ID is "cnt1905" and which are contents distributed and currently available are distinguished as currently rented, in accordance with the management-side contents storage status information.

In step S304, cabinet information is generated while the management-side change history information transmitted from the cabinet management server 6 is referred to. The cabinet information is information for recognizing the ratio of available contents distributed in the purchased cabinet, i.e. the number of free spaces in the cabinet.

FIG. 15 shows an example of the cabinet information. The cabinet information in FIG. 15 is generated based on the management-side contents storage status information the same as that shown in FIG. 2 and the management-side change history information the same as those in FIG. 3. FIG. 15 shows the fact that there is no free space in a cabinet with cabinet ID "cab1844927" while there are four free spaces in a cabinet with cabinet ID "cab1903944". Incidentally, the capacity of each cabinet can be recognized from its cabinet ID. In this example, the capacity of the cabinet whose first-two-digit number is "18" is 2 whereas the capacity of the cabinet whose first-two-digit number is "19" is 4.

Return to FIG. 11. When the list information and the cabinet information are generated, the portal server 3 transmits the browser 13 not only the generated list information and the generated cabinet information but also a confirmation result and a rental page generation instruction F109. The browser 13 generates rental page information by use of the received table information and the received cabinet information, and presents a rental page F110.

Figure 22:
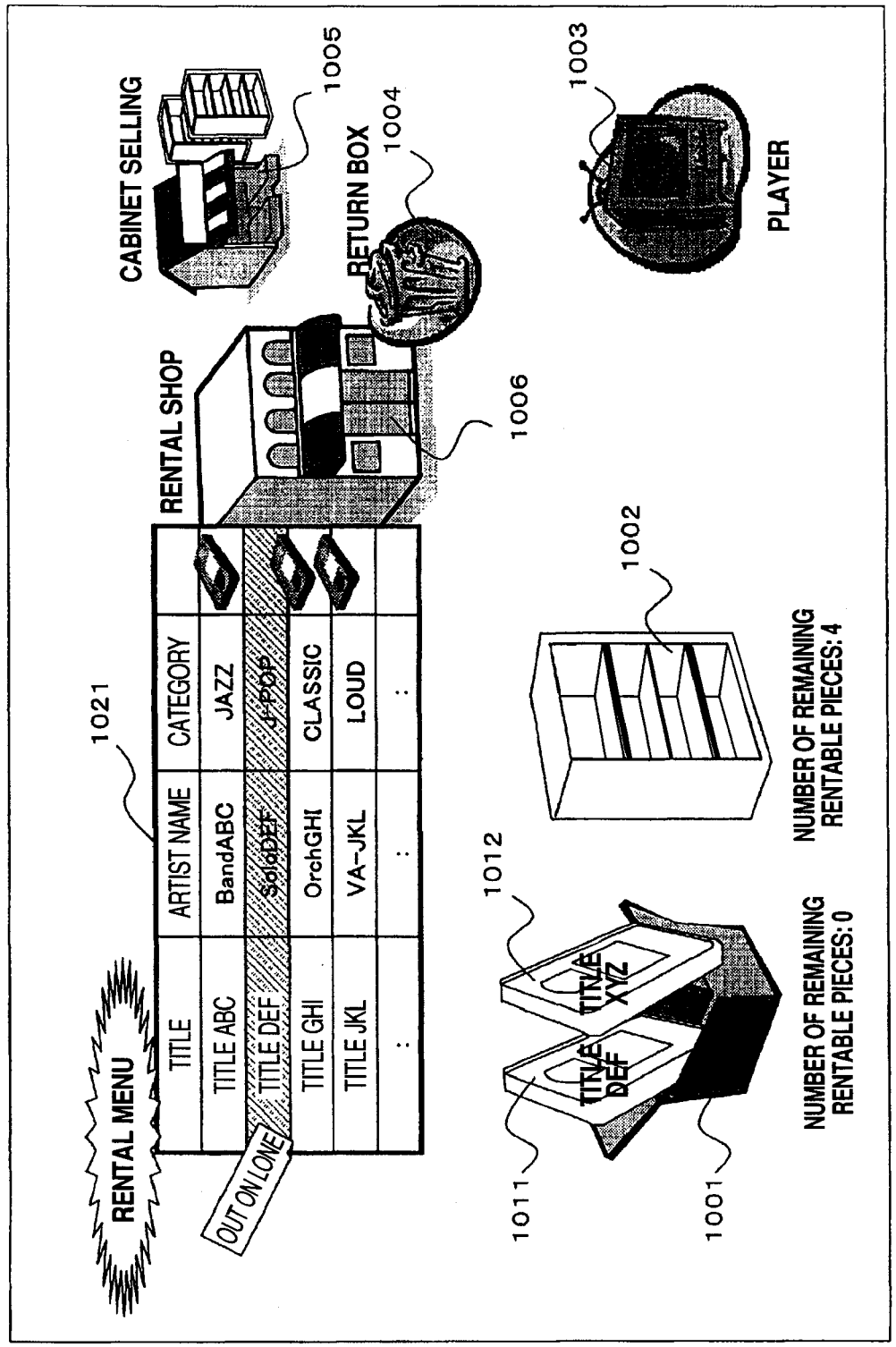
FIG. 22 A view showing a display example of a rental page screen in the contents distribution system for explaining the first embodiment of the present invention.

FIG. 22 shows a display example of a rental page screen. An icon 1001 in FIG. 22 indicates a cabinet whose capacity is 2 and which is occupied by contents designated by icons 1011 and 1012. On the other hand, an icon 1002 indicates a cabinet whose capacity is 4 and which is occupied by no contents. These pieces of display information are generated by use of the cabinet information in FIG. 15.

A table 1021 shows a list of currently open contents. The table 1021 is generated by use of the list of openable contents in FIG. 14. Information about four pieces of currently open contents is displayed in the table 1021. Among these pieces of contents, contents titled "Title DEF" are out on loan (distributed and currently available). The table 1021 shows contents which are allowed to be released by a rental shop designated by an icon 1006. When there is another rental shop, an icon indicating another rental shop is displayed. By an operation of selecting that icon, another table indicating openable contents is displayed.

An icon 1003 is provided for playing back contents. An icon 1004 is provided for returning (i.e. deleting) distributed contents. An icon 1005 is provided for purchasing a new cabinet. Contents are returned by an operation of dragging a contents icon occupied in the cabinet on the icon 1004.

Figure 16:
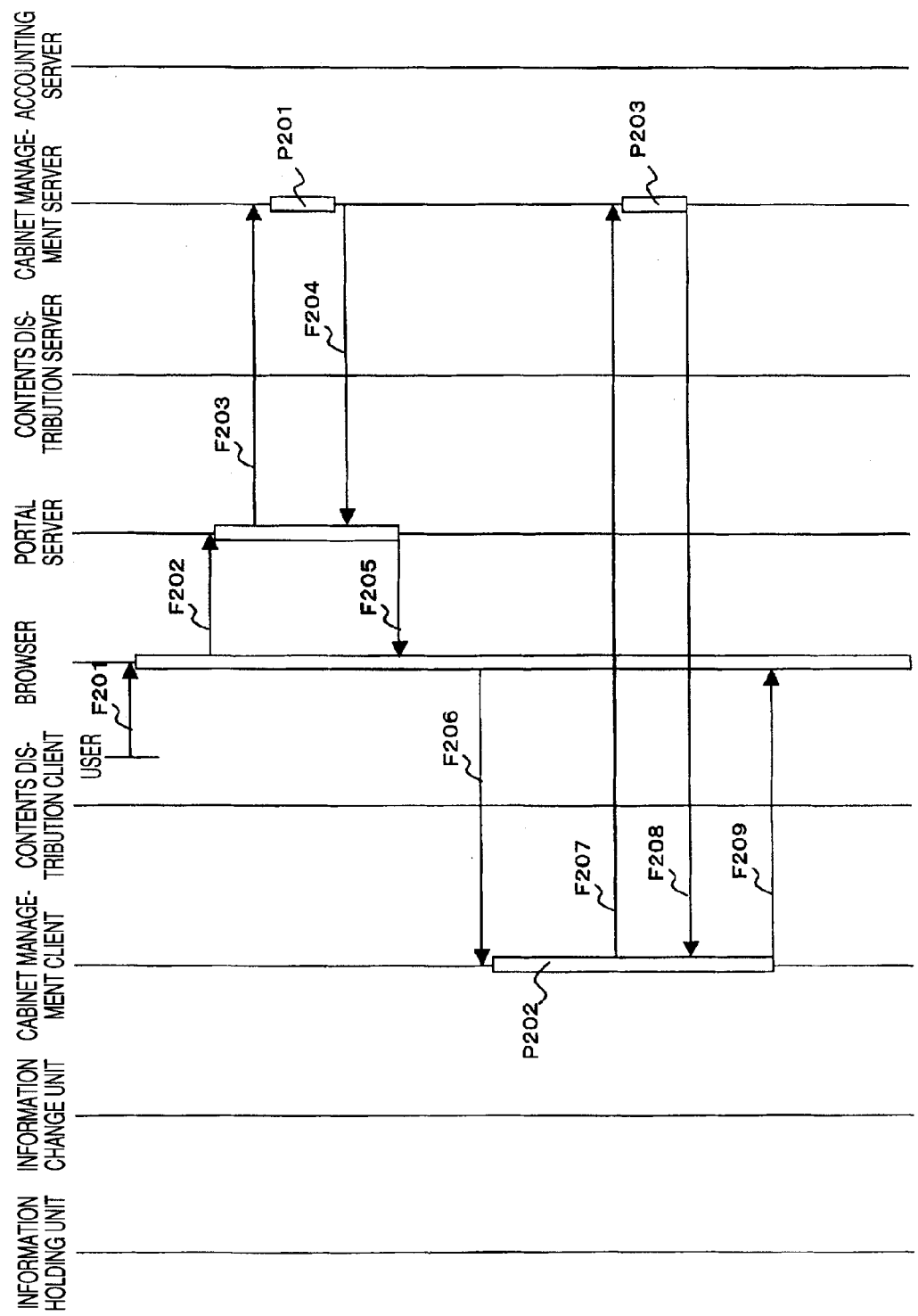
FIG. 16 A view showing operations for purchasing a cabinet in the contents distribution system for explaining the first embodiment of the present invention.
Figure 17:
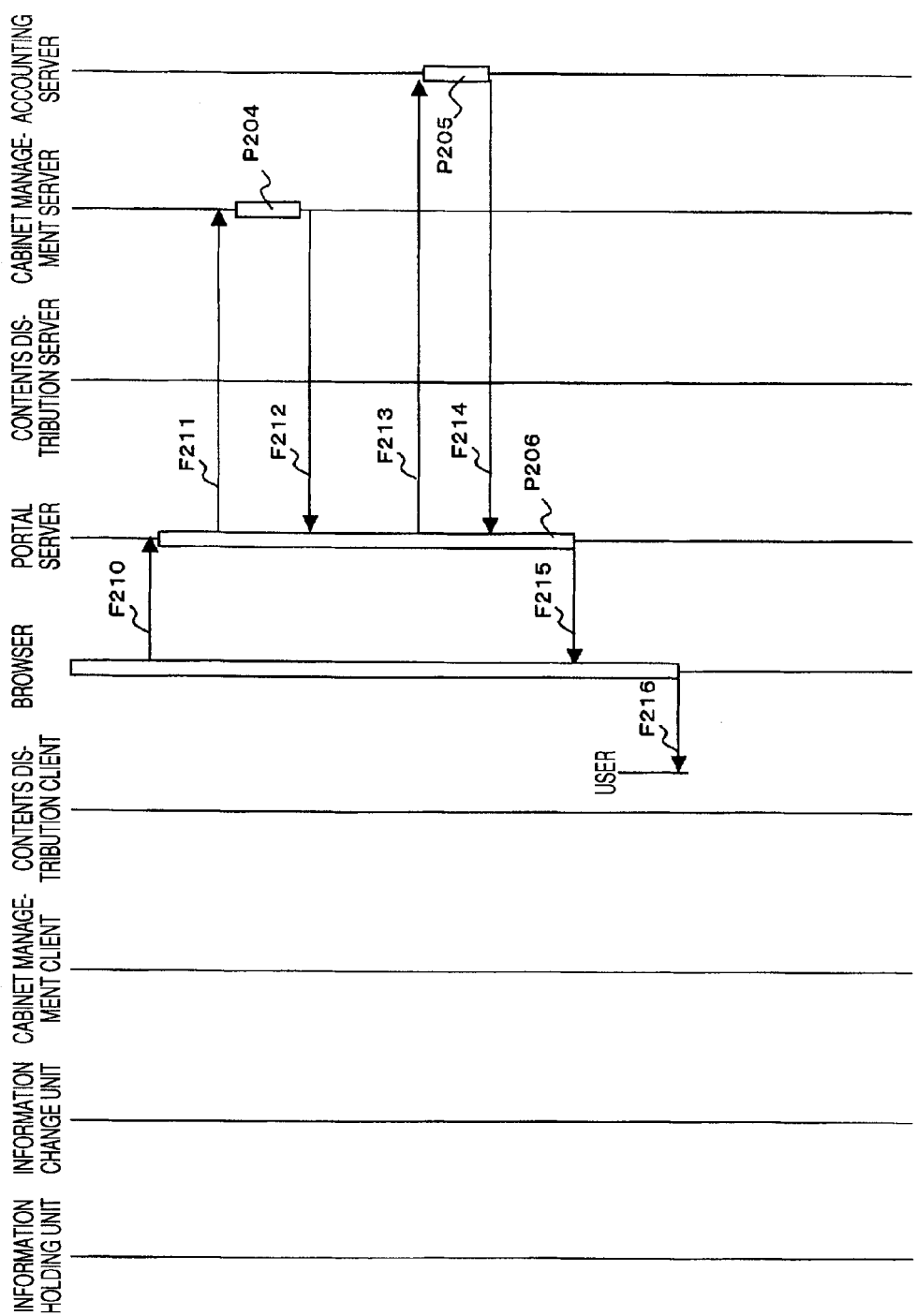
FIG. 17 A view showing operations for purchasing the cabinet in the contents distribution system for explaining the first embodiment of the present invention.

FIGS. 16 and 17 show operations for purchasing a cabinet.

To purchase a cabinet, the user inputs a cabinet purchase instruction F201 to the browser 13. Specifically, the user performs this input by an operation of selecting the icon 1005 in the condition that the rental page screen shown in FIG. 22 id displayed. The icon 1005 is provided for performing cabinet selling. When the icon 1005 is selected, icons indicating kinds of purchasable cabinets are displayed so that a desired kind of cabinet can be selected.

Figure 23:
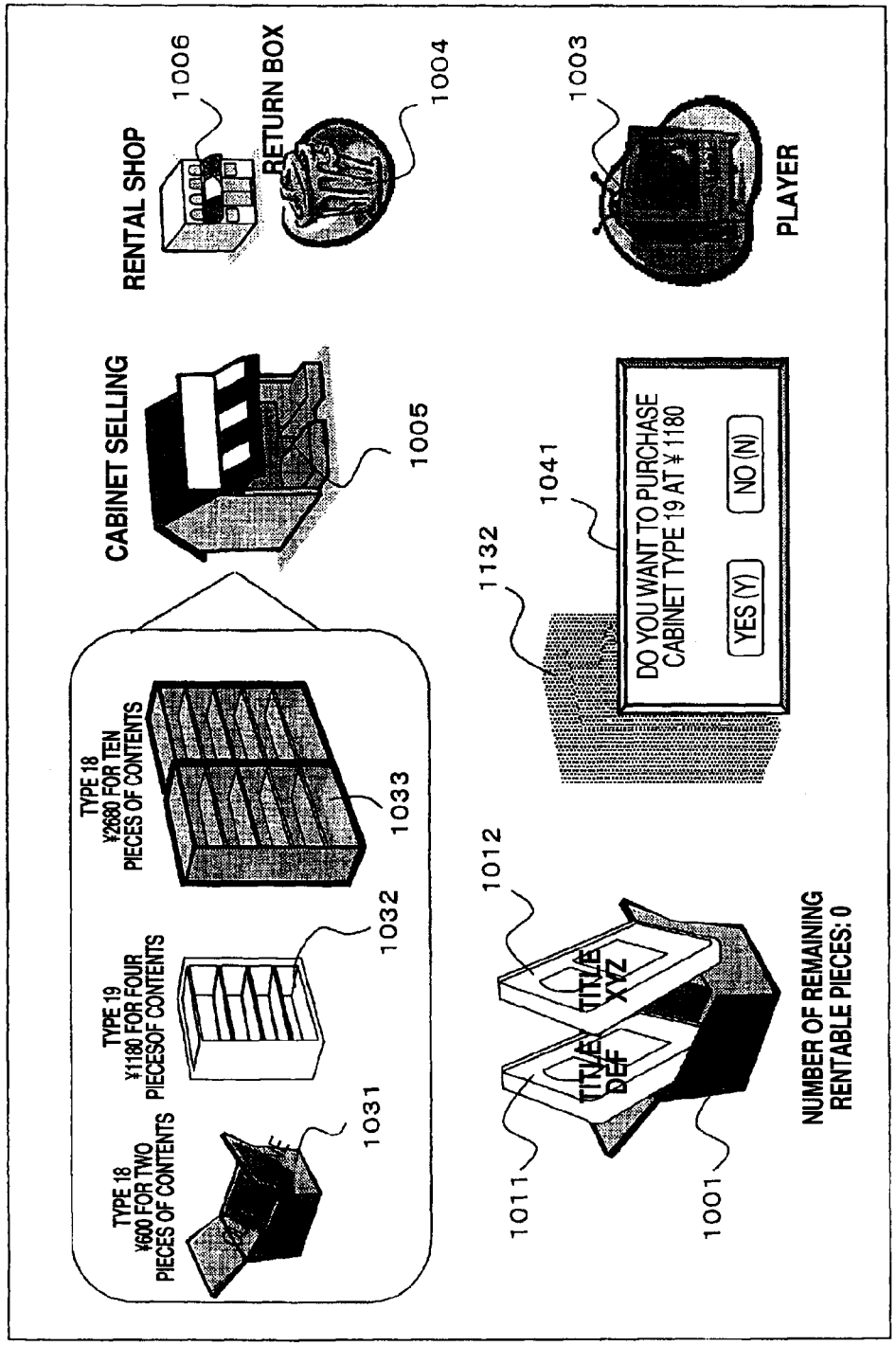
FIG. 23 A view showing a display example of a cabinet purchase screen in the contents distribution system for explaining the first embodiment of the present invention.

FIG. 23 shows a display example of a cabinet purchase screen. The display screen shown in FIG. 23 shows a state in the case where the capacity of a purchased cabinet designated by an icon 1001 is 2, kinds of sellable cabinets (designated by icons 1031, 1032, and 1033) are 3 and a "type 19" cabinet whose capacity is 4 is desired to be purchased. When an icon indicating a cabinet desired to be purchased (the icon 1032 in this case) is dragged on a position 1132, a dialog 1041 for confirmation is displayed. When a "Yes" button is selected, the kind of cabinet is input to the browser 13.

When the kind of cabinet desired to be purchased is input, the browser 13 transmits a cabinet addition preparation request F202 to the portal server 3. The portal server 3 transmits a cabinet addition preparation request F203 to the cabinet management server 6. On this occasion, the kind of cabinet desired to be purchased and a verification number acquired in advance are also transmitted.

Upon reception of the cabinet addition preparation request F203, the cabinet management server 6 first confirms the verification number (in the same manner as in the process P103). When the verification number can be confirmed, the cabinet management server 6 generates a cabinet ID (P201) and transmits the portal server 3 a cabinet addition preparation completion notice F204 together with the generated cabinet ID and the confirmation result.

Upon reception of the cabinet addition preparation completion notice F204, the portal server 3 transmits the browser 13 a cabinet addition preparation completion notice F205 together with the cabinet ID and the confirmation result. Upon reception of the cabinet addition preparation completion notice F205, the browser 13 transmits a cabinet addition request F206 together with the received cabinet ID. Incidentally, in the case where the confirmation in the cabinet management server 6 fails, the cabinet ID is not generated but only the confirmation result is transmitted to the browser 13. Accordingly, generation and transmission of a contents storage status report are performed again.

Upon reception of the cabinet addition request F206, the cabinet management client 11 adds a cabinet and generates a contents storage status report (P202). Addition of the cabinet is performed by adding a new change number entry to the change history information of the storage status holding unit 112. The contents storage status report is generated in the procedure shown in FIG. 4.

The cabinet management client 11 transmits the contents storage status report F207 to the cabinet management server 6 and the cabinet management server 6 verifies the received contents storage status report (P203). The contents storage status report is verified in the procedure shown in FIG. 7. A verification result F208 is transmitted to the cabinet management client 11. The cabinet management client 11 transmits a cabinet addition result F209 to the browser 13. When the verification in the process P203 succeeds, a verification number together with the verification result F208 and the cabinet addition result F209 is transmitted.

When the verification result is a verification failure, the browser 13 displays a screen shown in FIG. 27 and the routine of processing is terminated. The screen of FIG. 27 will be described later.

When the verification result is a verification success, the browser 13 transmits the portal server 3 an accounting request F210 together with the verification number. Upon reception of the accounting request F210, the portal server 3 transmits the cabinet management server 6 a contents status request F211 together with the verification number.

Upon reception of the contents status request F211, the cabinet management server 6 confirms the verification number (P204). When the verification number can be confirmed, the cabinet management server 6 sends a contents status notice F212 together with the confirmation result. The contents status notice includes the management-side contents storage status information and the management-side change history information stored in the storage status holding unit 122. The verification number is confirmed in the same manner as in the process P103.

Upon reception of the contents status notice F212, the portal server 3 transmits an accounting request F213 to the accounting server 7. On this occasion, the terminal apparatus ID (or a user ID if the user ID can be acquired from the terminal apparatus ID) and a charge are also transmitted. Upon reception of the accounting request F213, the accounting server 7 performs an accounting process (P205). The accounting process is performed on the person specified by the terminal apparatus ID or the user ID. When the accounting process is completed, the accounting server 7 sends an accounting completion notice F214 to the portal server 3.

Upon reception of the accounting completion notice F214, the portal server 3 generates distributable (rentable) contents list information and cabinet information (P206). This process is the same as the process P104 in the description of FIG. 11. When the list information and the cabinet information are generated, the portal server 3 transmits the browser 13 not only an accounting completion notice F215 but also the generated list information and the generated cabinet information.

The browser 13 generates rental page information by use of the received list information and the received cabinet information, and presents a rental page F216. FIG. 22 shows a display example of the rental page screen. After that, it is possible to use the newly purchased cabinet to receive distribution of contents.

Figure 18:
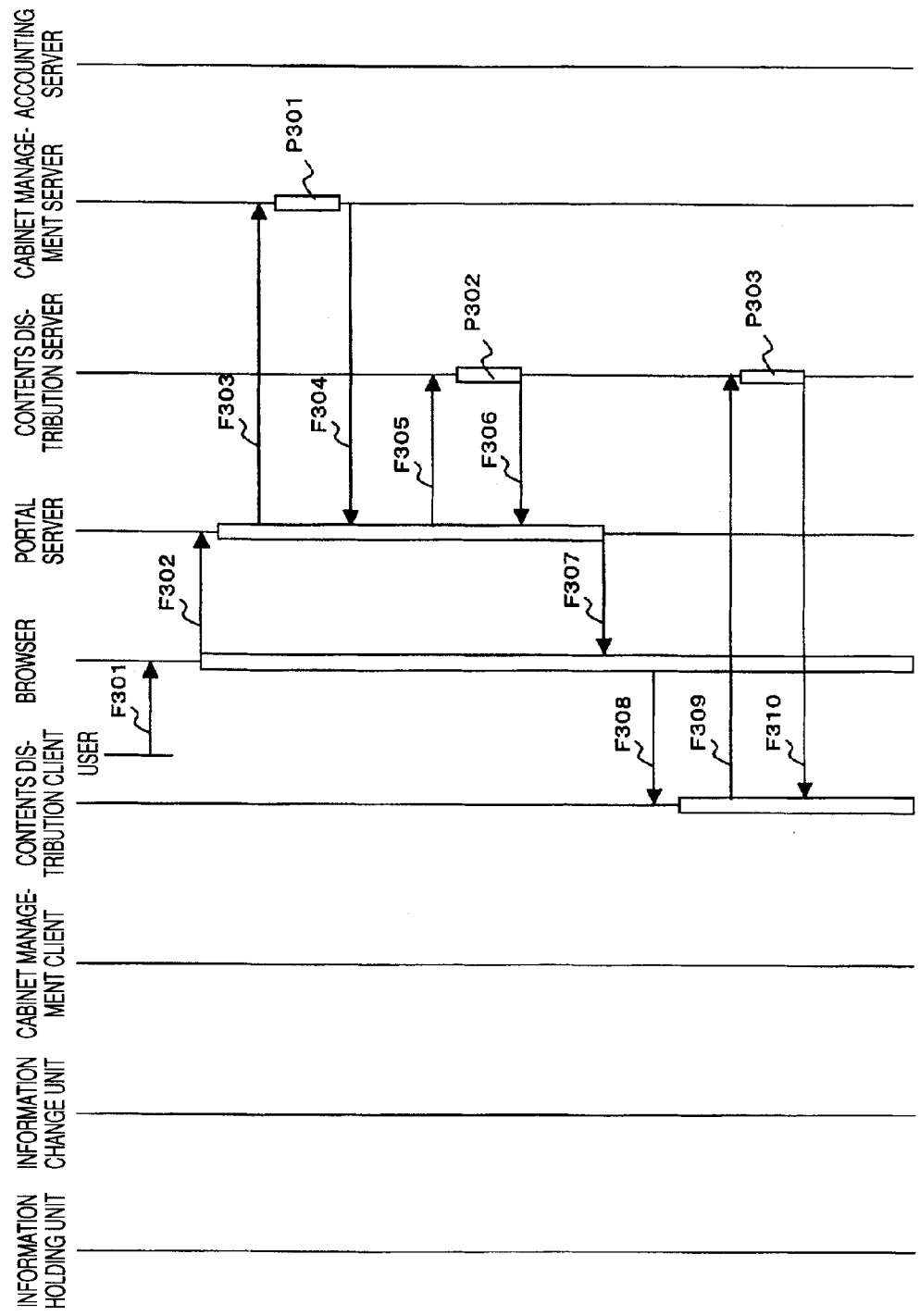
FIG. 18 A view showing operations for receiving distribution of contents in the contents distribution system for explaining the first embodiment of the present invention.
Figure 19:
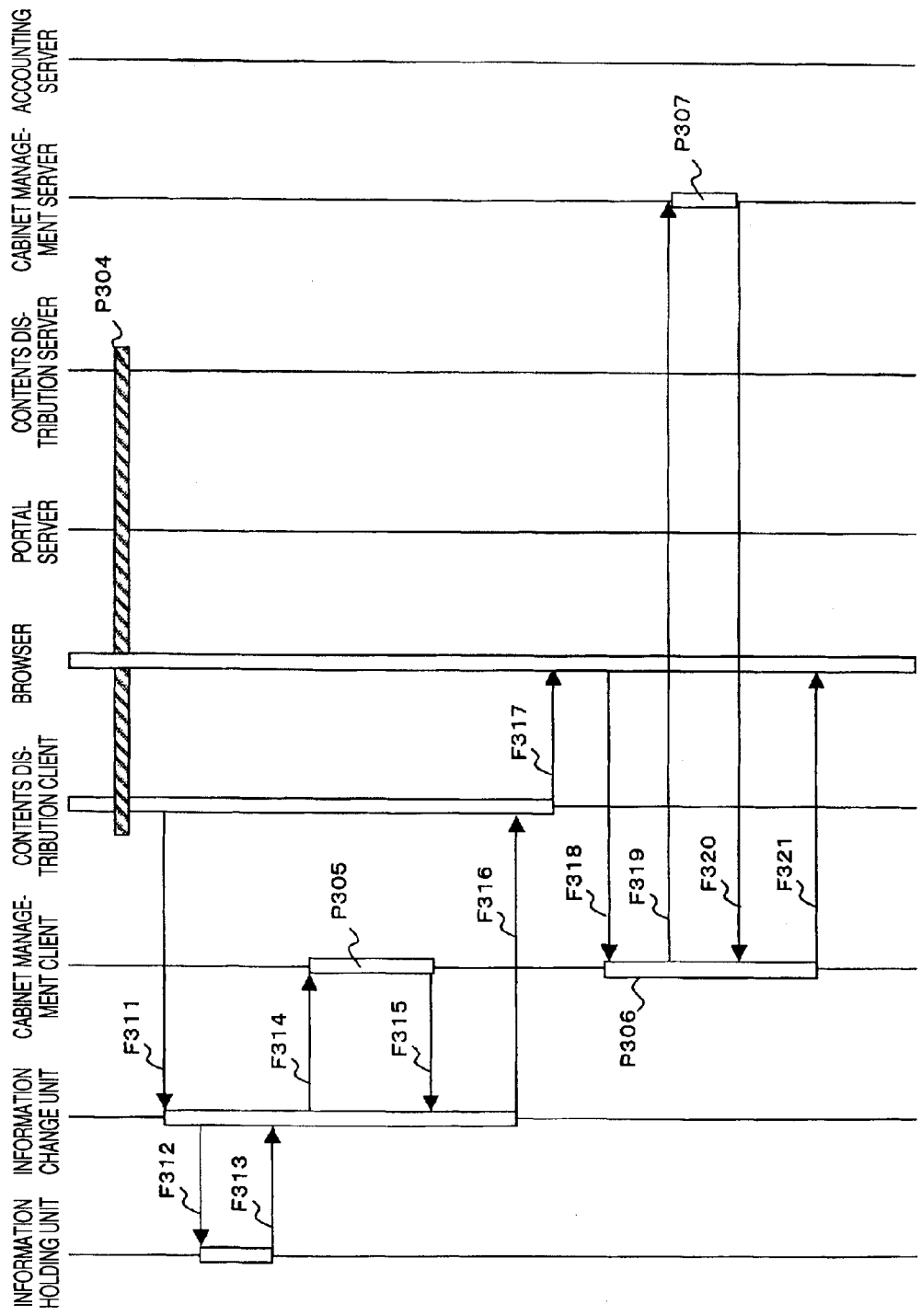
FIG. 19 A view showing operations for receiving distribution of the contents in the contents distribution system for explaining the first embodiment of the present invention.
Figure 20:
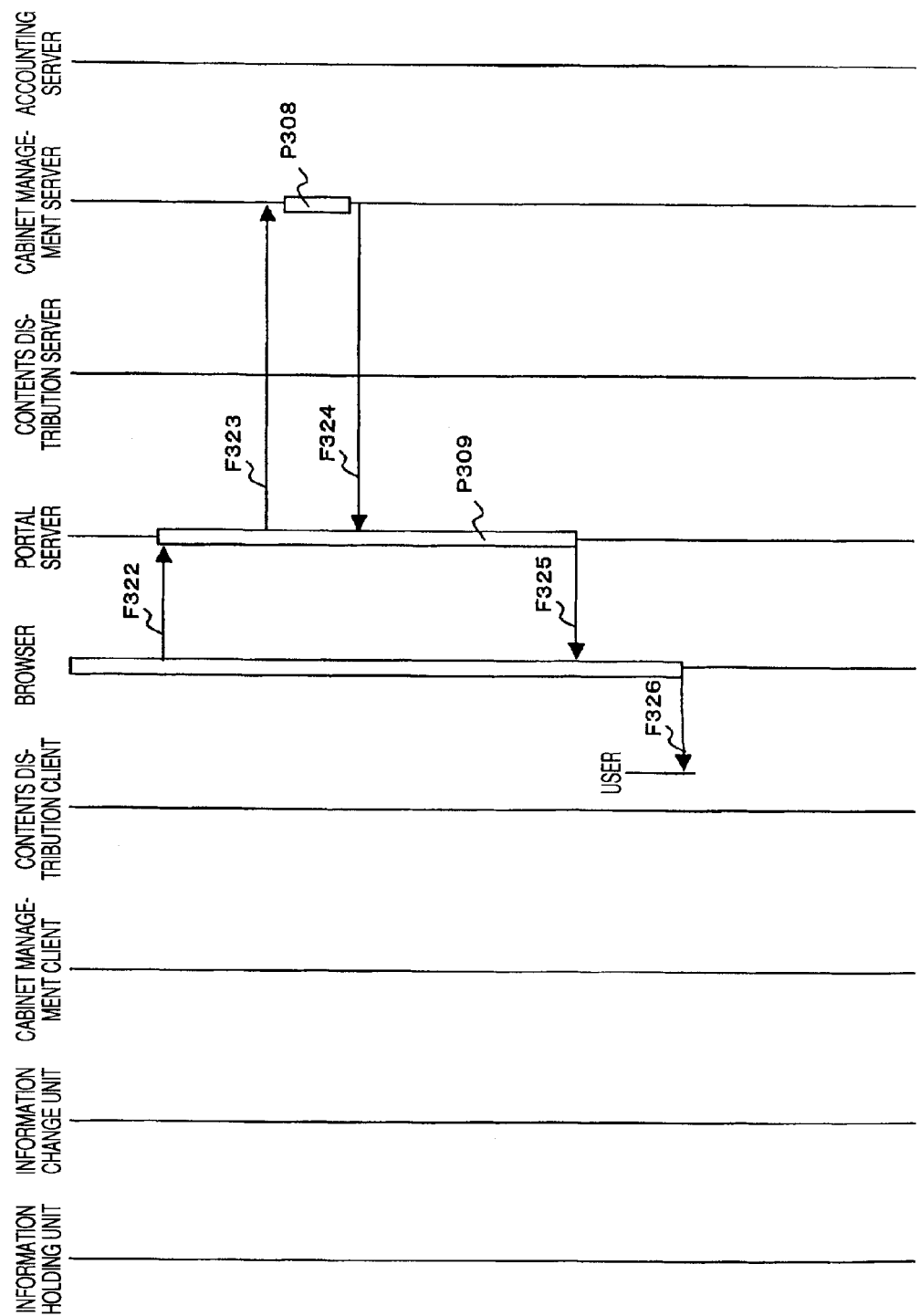
FIG. 20 A view showing operations for receiving distribution of the contents in the contents distribution system for explaining the first embodiment of the present invention.

FIGS. 18, 19 and 20 show operations for receiving distribution of contents (renting contents).

To rent contents, the user inputs a rental instruction F301 to the browser 13. Specifically, the user performs this input by an operation of dragging an icon indicating rentable contents on an icon indicating a cabinet, in the condition that the rental page screen shown in FIG. 22 is displayed.

Figure 24:
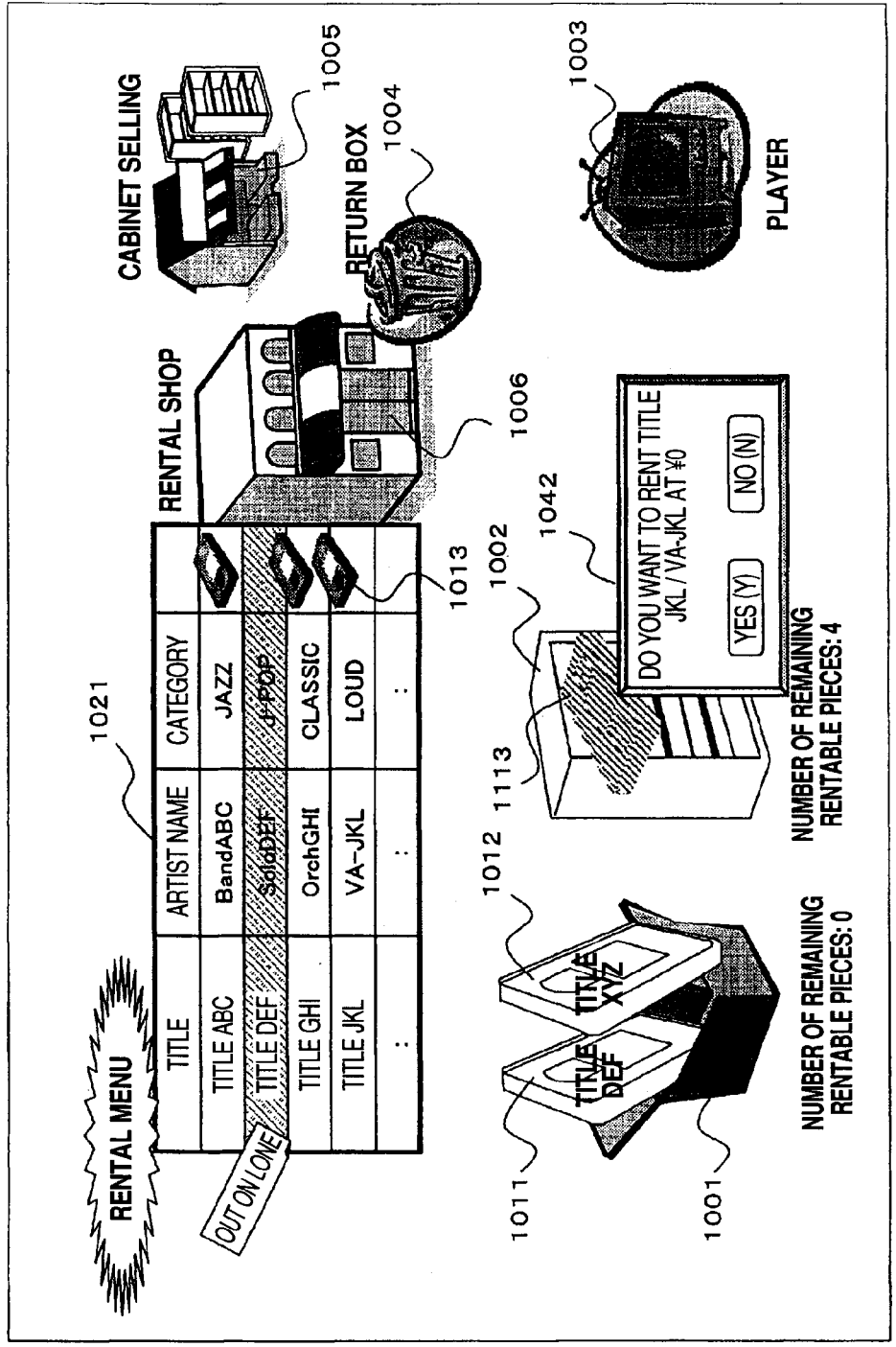
FIG. 24 A view showing a display example of a screen for a contents distribution request in the contents distribution system for explaining the first embodiment of the present invention.

An example of the rental page screen in the case where the icon indicating the contents has been dragged is shown in FIG. 24. FIG. 24 shows a display screen when an icon 1013 indicating contents titled "Title JKL" and which are desired to be rented has been dragged on a position 1113 on an icon 1002 indicating a cabinet. When such an operation is performed, the browser 13 decides that the contents titled "Title JKL" are desired to be rented in the cabinet specified by the icon 1002, and displays a dialog 1042.

When a "Yes" button of the dialog 1042 is pushed in this state, the browser 13 transmits the portal server 3 a rental distribution preparation request F302 together with an ID of the contents desired to be rented, a cabinet ID and a verification number. Upon reception of the rental distribution preparation request F302, the portal server 3 transmits the cabinet management server 6 a contents status request F303 together with the verification number. Upon reception of the contents status request F303, the cabinet management server 6 confirms the received verification number (P301). When the verification number can be confirmed, the cabinet management server 6 sends a contents status notice F304 together with the confirmation result. The contents status notice includes the management-side contents storage status information and the management-side change history information stored in the storage status holding unit 122. Incidentally, the verification number can be confirmed in the same manner as in the process P103.

Upon reception of the contents status notice F304, the portal server 3 transmits a contents distribution preparation request F305 to the contents distribution server 5. At that time, the portal server 3 also transmits the ID of the contents desired to be distributed, and the cabinet ID as a distribution destination. Upon reception of the contents distribution preparation request F305, the contents distribution server 5 confirms the contents ID and generates a distribution number (P302). The contents distribution server 5 transmits the portal server 3 a contents distribution preparation completion notice F306 together with a confirmation result of the contents ID (a confirmation result as to whether the contents are allowed to be distributed or not), the ID of the contents whose distribution preparation is completed, the cabinet ID as a distribution destination, and the distribution number.

Upon reception of the contents distribution preparation completion notice F306, the portal server 3 transmits the browser 13 a rental distribution preparation completion notice F307 together with the confirmation result of the contents ID and the distribution number.

Upon reception of the rental distribution preparation completion notice F307, the browser 13 transmits the contents distribution client 12 a reception start request F308 together with the ID of the contents whose distribution preparation is completed, the cabinet ID as a distribution destination and the distribution number.

Upon reception of the reception start request F308, the contents distribution client 12 transmits the contents distribution server 5 a contents distribution start notice F309 together with a distribution number. The contents distribution server 5 confirms coincidence between the received distribution number and the distribution number generated when the contents distribution preparation request is received from the portal server 3 (P303). When the distribution numbers are coincident with each other, the contents distribution server 5 transmits a contents distribution start notice F310 to the contents distribution client 12. On this occasion, the contents distribution server 5 also transmits the distribution number, a distribution URL indicating a distribution source, and a contents size.

Upon reception of the contents distribution start notice F310, the contents distribution client 12 cooperates with the contents distribution server 5 to perform distribution of the contents in accordance with HTTP downloading and based on the contents URL (P304). When distribution of the contents is completed, the contents distribution client 12 transmits a contents storage request F311 to the information change unit 113. On this occasion, the contents distribution client 12 also transmits the contents ID of the distributed contents, the cabinet ID and a temporary file path for the distribution. The information change unit 113 transmits the information holding unit 111 a data storage request F312 together with a file path as a contents storage destination.

The information holding unit 111 stores the distributed contents in a position designated by the received file path. After completion of the storage, the information holding unit 111 sends a data storage completion notice F313 to the information change unit 113. In this condition, the distributed new contents are held in a predetermined area of the terminal apparatus 1.

Upon reception of the data storage completion notice F313, the information change unit 113 transmits the cabinet management client 11 a contents status change request F314 together with the contents ID of the newly stored contents, the cabinet ID and the file path to the contents.

Upon reception of the contents status change request F314, the cabinet management client 11 changes the contents status of the contents status holding unit 112 (P305). Specifically, a new entry is added to the change history information so that a change time, a change kind ("add" because the contents are distributed in this case), the cabinet ID and the contents ID are stored therein. The new contents are added to the contents storage status information so that the contents ID, the cabinet ID, the status ("available" because they are allowed to be used in this case), the contents storage path, and the contents details (for reading out binary data as part of the contents from the information holding unit 111) are stored therein.

When change of the contents status is completed, the cabinet management client 11 transmits a contents status change completion notice F315 to the information change unit 113. The information change unit 113 sends a contents storage completion notice F316 to the contents distribution client 12. The contents distribution client 12 sends a reception completion notice F317 to the browser 13.

Upon reception of the reception completion notice F317, the browser 13 transmits a status report transmission request F318 to the cabinet management client 11.

Upon reception of the status report transmission request F318, the cabinet management client 11 generates a contents storage status report (P306). The contents storage status report is generated in the procedure shown in FIG. 4. The generated contents storage status report F319 is transmitted to the cabinet management server 6. In the cabinet management server 6, a status report verification process is performed by use of the received contents storage status report F319 (P307). The status report verification process is performed in the procedure shown in FIG. 7. A verification result F320 is transmitted to the cabinet management client 11. The cabinet management client 11 transmits a verification result F321 to the browser 13. When the verification result succeeds, a verification number together with the verification results F320 and F321 is transmitted.

When the verification result is a verification success, the browser 13 transmits a rental page request F322 to the portal server 3. On this occasion, the verification number is also transmitted. Upon reception of the rental page request F322, the portal server 3 transmits the cabinet management server 6 a contents status request F323 together with the verification number. Upon reception of the contents status request F323, the cabinet management server 6 confirms the received verification number (P308). When the verification number can be confirmed, the cabinet management server 6 sends a contents status notice F324 together with the confirmation result. The contents status notice includes the management-side contents storage status information and the management-side change history information stored in the storage status holding unit 122. The verification number can be confirmed in the same manner as in the process P103.

Upon reception of the contents status notice F324, the portal server 3 generates distributable (rentable) contents list information and cabinet information (P309). This process is performed in the same manner as in the process P104 of FIG. 11.

When the list information and the cabinet information are generated, the portal server 3 transmits the browser 13 not only the generated list information and the generated cabinet information but also the confirmation result and a rental page generation instruction F325. The browser 13 generates rental page information by use of the received list information and the received cabinet information, and presents a rental page F326.

When the user tries to input a rental instruction F301 and drags an icon indicating rentable contents on an icon indicating a cabinet, but there is no free space in the cabinet designated by the icon and there is no free space in any other purchased cabinet, the browser 13 prompts the user to return distributed contents or additionally purchase a cabinet.

Figure 25:
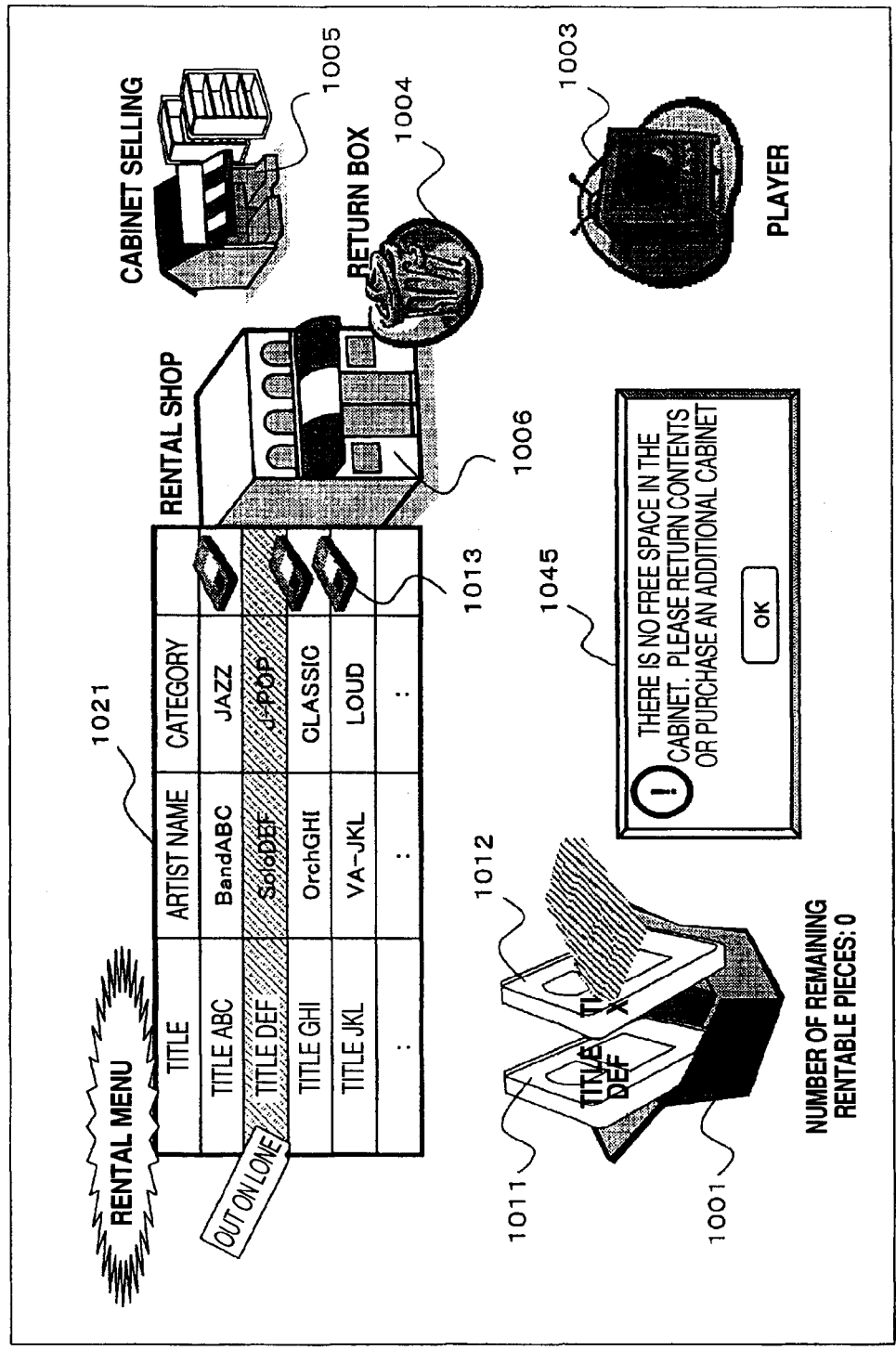
FIG. 25 A view showing a display screen example of a browser when distribution cannot be performed in the contents distribution system for explaining the first embodiment of the present invention.

FIG. 25 shows an example of a display screen of the browser in this case. In FIG. 25, there is shown a display screen in the case where an icon 1013 indicating rentable contents has been dragged on an icon 1001 indicating a cabinet. The capacity of the cabinet designated by the icon 1001 is 2. Two pieces of contents designated by icons 1011 and 1012 have been rented in the cabinet. Accordingly, no more contents are allowed to be rented, so that a dialog 1045 is displayed to prompt the user to return the rented contents or additionally purchase a cabinet.

Figure 21:
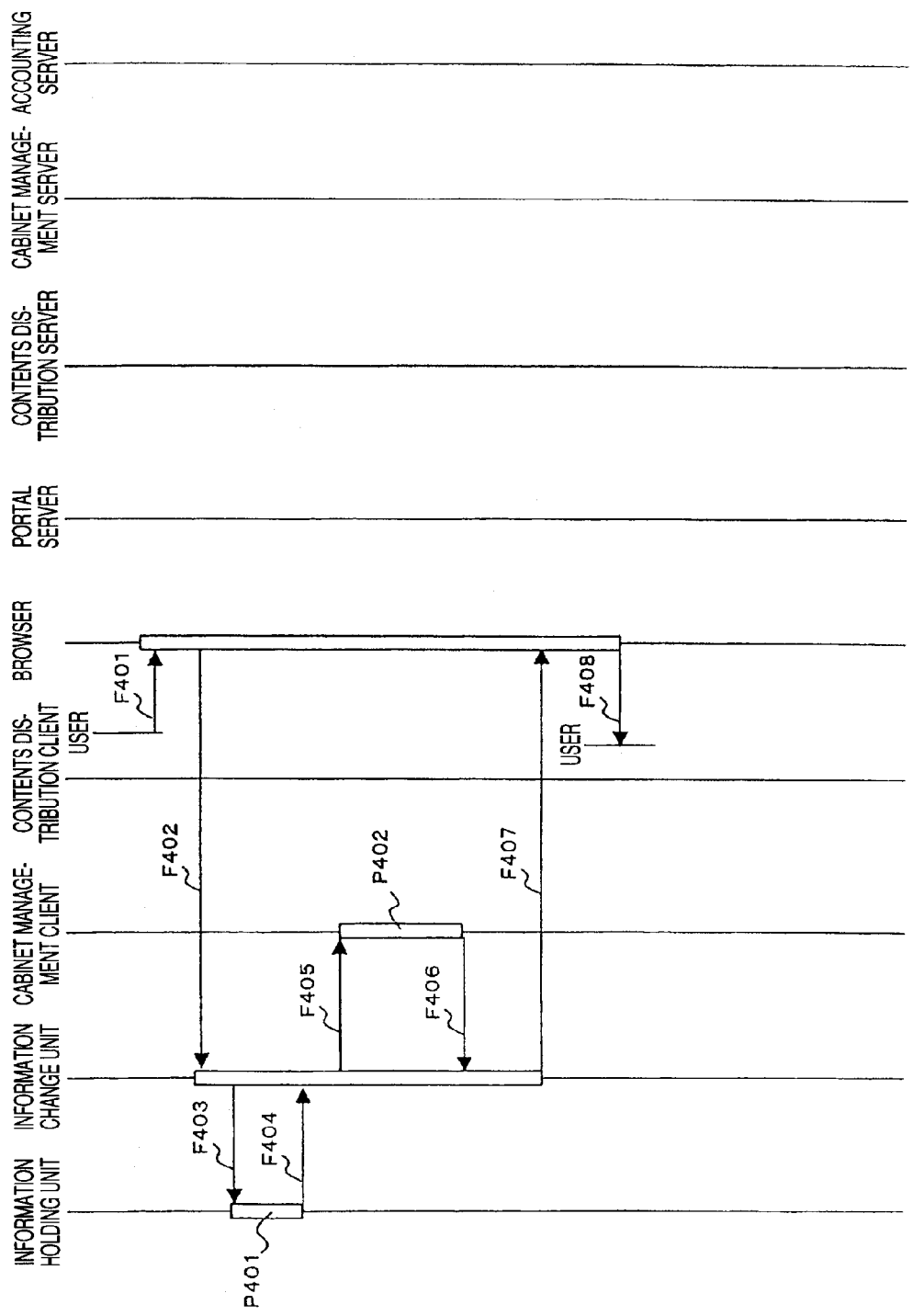
FIG. 21 A view showing operations for returning contents in the contents distribution system for explaining the first embodiment of the present invention.

FIG. 21 shows operations for returning contents (deleting contents).

To return contents, the user inputs a return instruction F401 to the browser 13. Specifically, the user performs this input by an operation of dragging an icon indicating rented contents on an icon indicating return in the condition that a rental page screen shown in FIG. 22 is displayed. In addition to an on-line condition of being connected to the portal server 3, the returning process can be performed in an off-line condition. In this case, the browser 13 holds previous data used in the rental page screen (either in the case of an on-line operation or in the case of an off-line operation) and uses the data for display.

Figure 26:
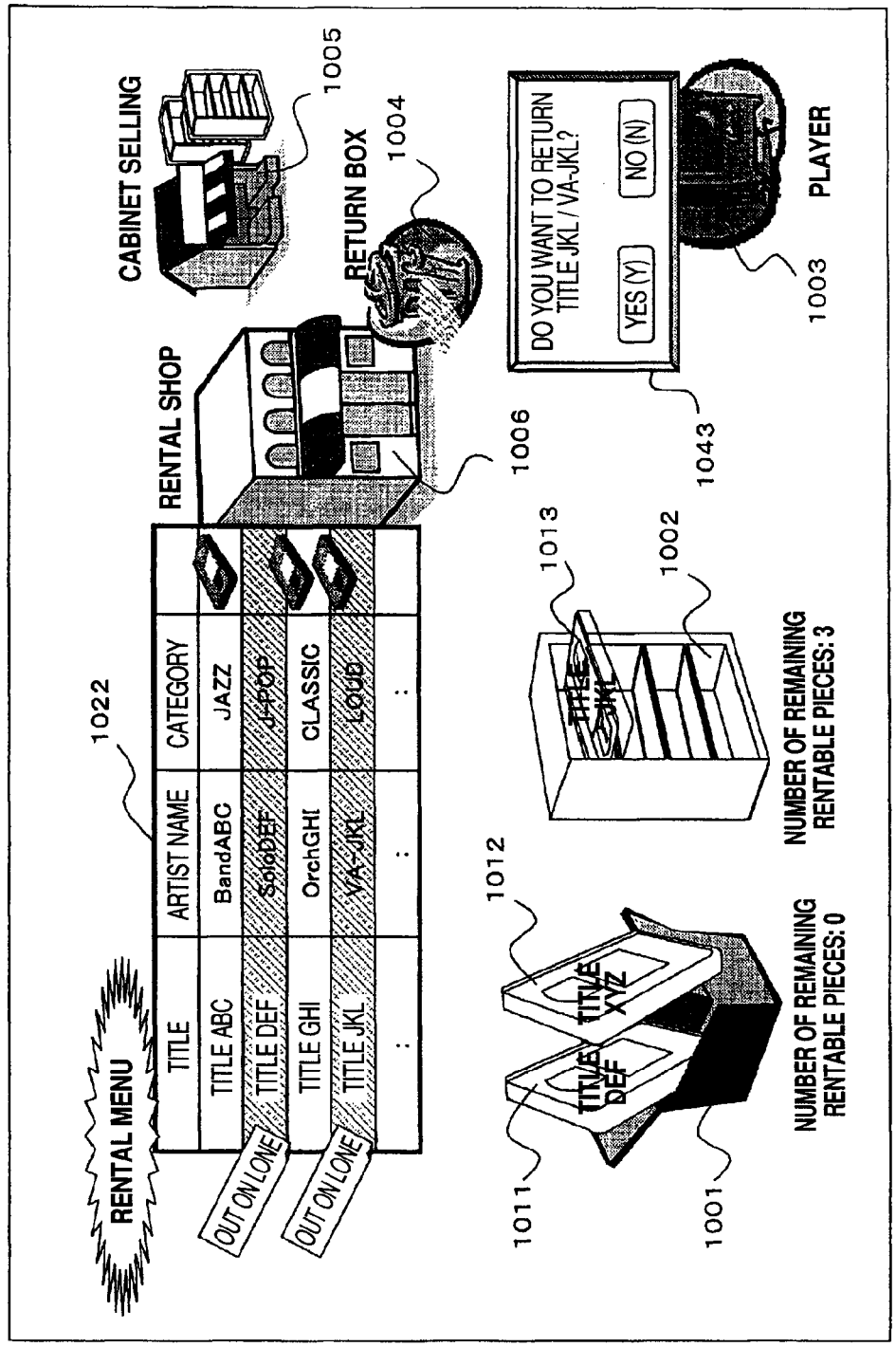
FIG. 26 A view showing a display screen example when contents are returned in the contents distribution system for explaining the first embodiment of the present invention.

FIG. 26 shows an example of the rental page screen in the case where an icon indicating contents has been dragged. In FIG. 26, there is shown a display screen in the case where an icon 1013 indicating rented contents titled "Title JKL" has been dragged on an icon 1004 indicating return in order to return the contents. When such an operation is performed, the browser 13 decides that the contents titled "Title JKL" are desired to be returned, and displays a dialog 1043.

When a "Yes" button of the dialog 1043 is pushed in this condition, the browser 13 transmits the information change unit 113 a content deletion request F402 together with an ID of the contents desired to be returned and a cabinet ID. Upon reception of the contents deletion request F402, the information change unit 113 transmits the information holding unit 111 a data change request F403 together with a file path. Upon reception of the data change request F403, the information holding unit 111 overwrites the contents with random values based on the received file path so as to make the contents not available (P401). When the overwriting is completed, the information holding unit 111 sends a data change completion notice F404 to the information change unit 113.

The information change unit 113 transmits the cabinet management client 11 a contents status change request F405 together with the contents ID of the deleted contents, the cabinet ID and the file path.

Upon reception of the contents status change request F405, the cabinet management client 11 changes the contents status (P402). Specifically, a new entry is added to the change history information of the storage status holding unit 112 so that a change time, a change kind ("del" because the contents are deleted in this case), the cabinet ID and the contents ID are stored therein. Information about the contents in the contents status information is rewritten. That is, the contents status indicating "available" is rewritten with "deleted". Binary data as part of the contents are read based on the file path so that the details of the contents are rewritten. At this point of time, data in a corresponding storage area of the information holding unit 111 are overwritten with random data. Thus, the details of the contents in the contents storage status information are also rewritten with random data.

When change of the contents status is completed, the cabinet management client 11 sends a contents status change completion notice F406 to the information change unit 113. The information change unit 113 sends a contents deletion completion notice F407 to the browser 13. The browser 13 presents a return completion F408 to the user.

When the contents returning process is performed in an off line condition, the contents storage status information and the change history information stored in the storage status holding unit 112 of the cabinet management client 11 are not coincident with the management-side contents storage status information and the management-side change history information stored in the storage status holding unit 122 of the cabinet management server 6. This not-coincidence will not cause any problem because the contents storage status information and the change history information stored in the storage status holding unit 112 of the cabinet management client 11 will be coincident with the management-side contents storage status information and the management-side change history information stored in the storage status holding unit 122 of the cabinet management server 6 when the terminal apparatus 1 is operated on line next time.

Assume that verification fails when a contents storage status report is verified (e.g. in the process P102 of FIG. 11, the process P203 of FIG. 16 and the process P307 of FIG. 19). In this case, a screen shown in FIG. 27 is displayed and prompts the user to reinstall cabinets. On that occasion, icons 1051, 1052, 1061 and 1062 indicating destruction of contents and the cabinets are displayed, and a dialog 1044 is displayed to prompt the user to reinstall the cabinets.

Although description has been made in the case where the value (price) of contents supplied for distribution is constant and not reduced even at the time of returning, the value may vary in accordance with each piece of contents and be changed at the time of returning. On that occasion, information indicating values of pieces of contents is displayed when a list of openable contents is displayed or when contents to be returned are selected. When contents are desired to rented, the value corresponding to a free space of the cabinet may be compared with the value of the contents desired to be rented, so that judgment is made as to whether the contents are allowed to be rented or not. Alternatively, accounting for the difference between the value corresponding to the free space of the cabinet and the value of the contents desired to be rented may be performed. The contents distribution system according to the present invention may be used based on a service model in which a monthly or annual member fee is charged for the difference caused by reduction in the value of contents.

As described above, the contents distribution system according to the present invention can be managed with payment settlement made only at the time of purchase of a cabinet. The contents user and provider do not have to manage use periods of distributed contents. That is, the provider may just manage available contents at that time in accordance with each user. Each user may just manage contents only when the user wants to use new contents. Since deletion of distributed contents can be surely recognized by the distribution service-side server, the contents can be deleted and new contents in accordance with a free space of the cabinet generated due to the deleted contents can be rented.

Accordingly, the user can use an approximately unlimited number of pieces of contents at constant cost by shortening a use period of each piece of contents. If necessary, the user can use specific contents permanently, similarly to purchase.

Second Embodiment

A second embodiment is also implemented by the contents distribution system depicted in FIG. 1. The second embodiment is basically the same as the first embodiment except that information included in a contents storage status report is different. The different part will be described below while description of the common part is omitted. In the first embodiment, the contents storage status generation report includes the contents storage status information of all the contents distributed to the terminal apparatus 1. On the other hand, in the second embodiment, contents storage status information of only changed contents is included.

Now, assume that the contents storage status information shown in FIG. 2 and the change history information shown in FIG. 3 are stored in the storage status holding unit 112. In this case, the status report generation unit 114 generates a contents storage status report including only information of information number "inf00003" in FIG. 2 as contents storage status information. That is, only the contents storage status information of contents corresponding to an unreported change history is included in the contents storage status report. When distribution of contents is received newly, the contents are stored in the information holding unit 111 and the contents status of the contents status holding unit 112 is changed (P305 in FIG. 19). Then, upon reception of a status report transmission request F318 of FIG. 19, the status report generation unit 114 generates a contents storage status report including the contents storage status information of only the contents.

When such a contents storage status report is received, part of management-side contents storage status information is updated based on the contents storage status information included in the received contents storage status report.

When the contents storage status information of only the changed contents is included in the contents storage status report, it is possible to make a contents storage status report more easily. That is, when contents are deleted, the contents storage status information per se is not included in the contents storage status report but deletion indication information obtained by applying a predetermined arithmetic operation such as a hashing operation to part of the contents storage status information (specifically, the contents ID and the contents storage path) is included in the contents storage status report.

Figure 28:
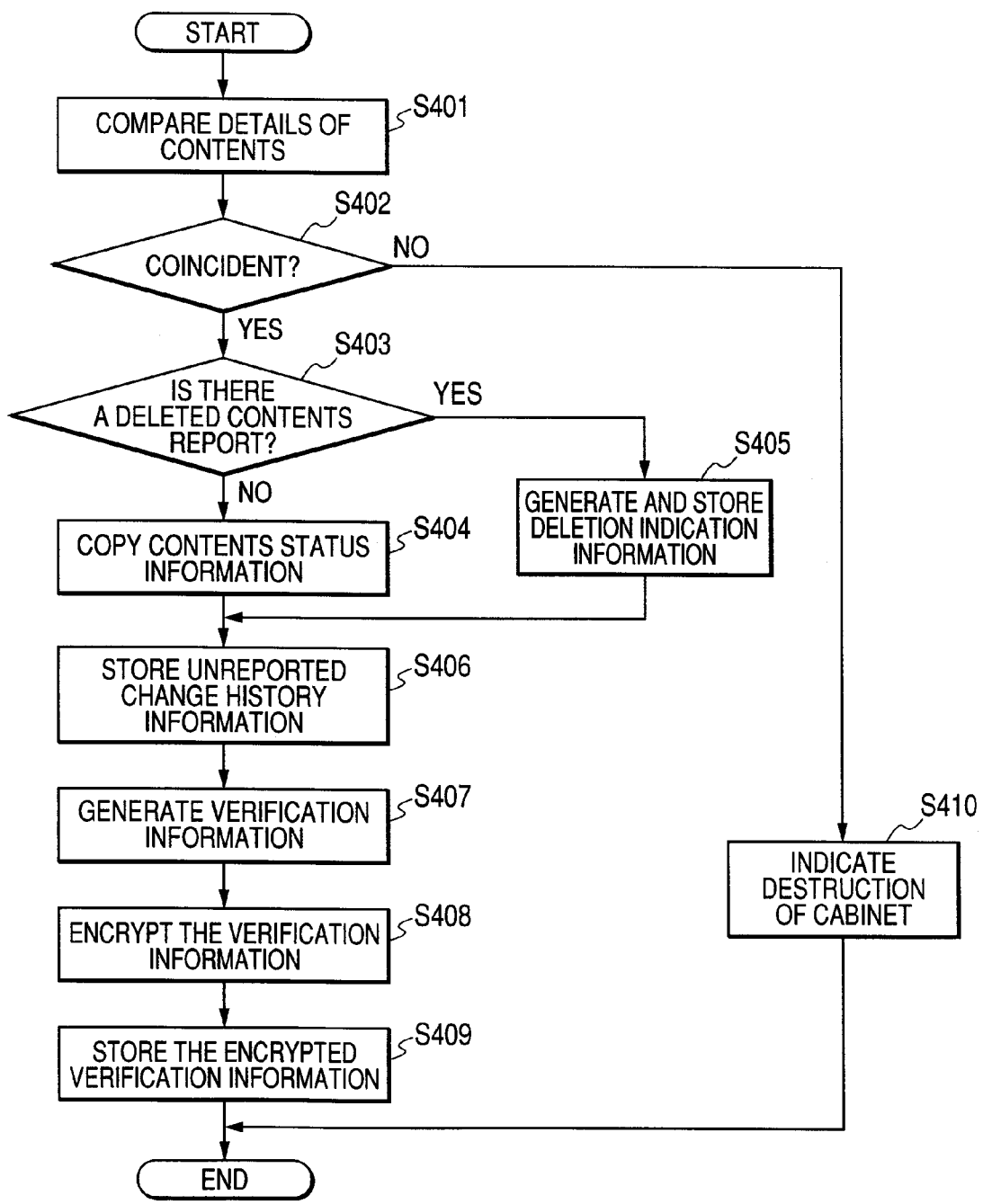
FIG. 28 A flow chart showing the outline of a contents storage status report generation process in a contents distribution system for explaining a second embodiment of the present invention.

FIG. 28 shows a flow chart of the outline of a contents storage status report generation process according to the second embodiment.

This flow is a flow when the deletion indication information is used. In step S401, the details of contents held in the information holding unit 11 and the details of contents included in the contents storage status information (see FIG. 2) are compared with each other. This step is performed for confirming that the details of the contents storage status information are normal (not destroyed). When judgment in the step S402 concludes that a result of the comparison is not coincident, a notice indicating destruction of the cabinet is sent (step S410) and the routine of processing is terminated.

When the details of contents are coincident with each other, judgment is made in step S403 as to whether the contents storage status information included in the contents storage status report is contents storage status information concerned with deleted contents or not. When it is contents storage status information concerned with deleted contents, deletion indication information is generated and stored together with an information number in a status report storage area in step S405. When it is not contents storage status information concerned with deleted contents, the contents storage status information to be reported is copied and stored in the status report storage area in step S404.

Next, unreported change history information is stored (in step S406), verification information is generated (in step S407), the verification information is encrypted (in step S408) and the encrypted verification information is stored (in step S409), in the same manner as in the contents storage status report generation process shown in FIG. 4. The steps S406 to S409 are the same as the steps S104 to S107 in FIG. 4, so that description thereof is omitted.

Figure 29:
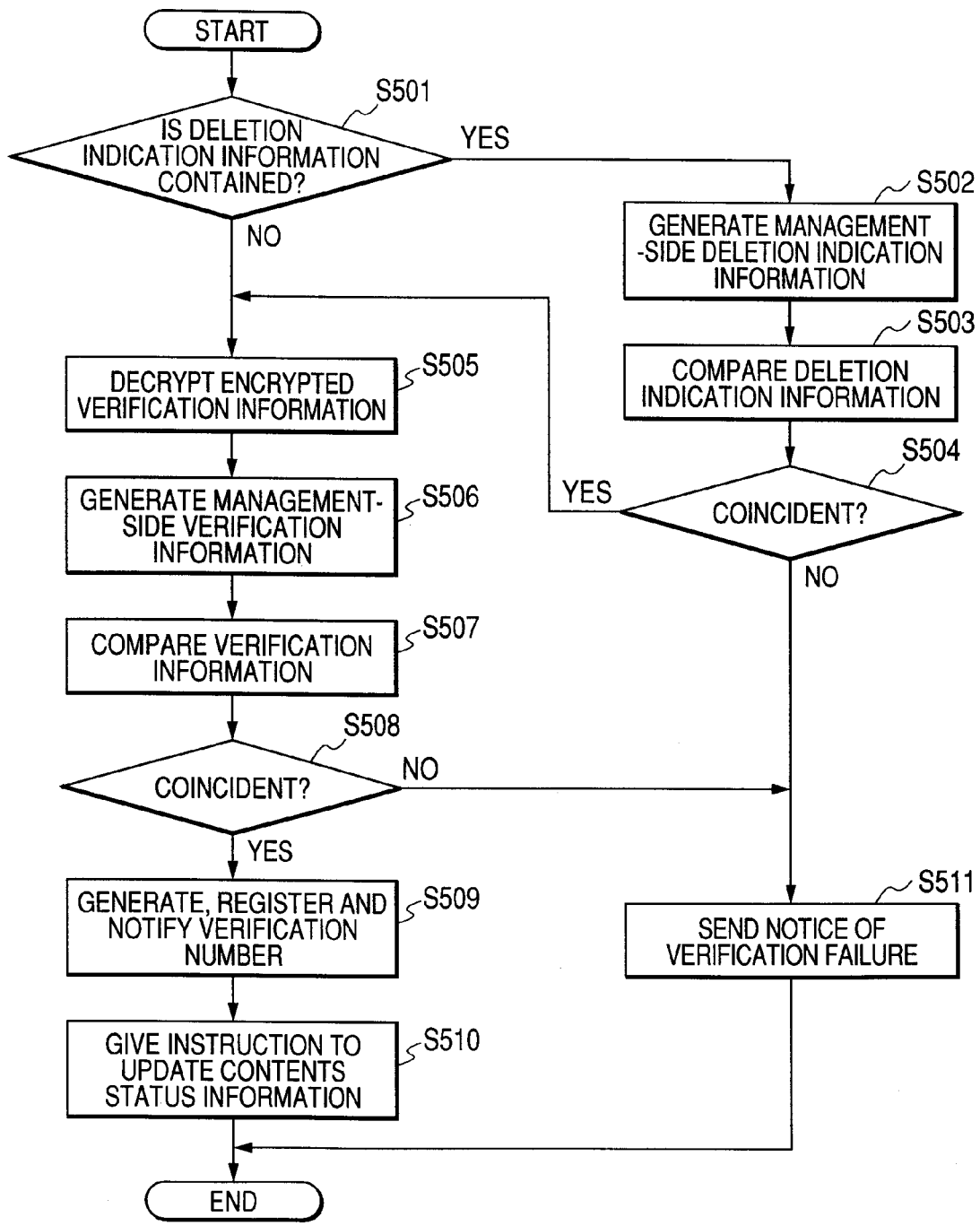
FIG. 29 A flow chart showing the outline of a contents storage status report verification process in the contents distribution system for explaining the second embodiment of the present invention.

FIG. 29 shows a flow chart of the outline of a contents storage status report verification process according to the second embodiment.

This flow is a flow when the contents storage status report generated in the procedure shown in FIG. 28 is received. In step S501, judgment is made as to whether the deletion indication information is included in the contents storage status report or not.

When the deletion indication information is included, management-side deletion indication information is generated based on the corresponding information number while the management-side contents storage status information is referred to. The item and arithmetic operation used for generation of the management-side deletion indication information are the same as those used for generation of the deletion indication information in the terminal apparatus 1. Since the details of the items are coincident with each other, the received deletion indication information and the management-side deletion indication information are coincident with each other as long as there no problem in the contents storage status information of the terminal apparatus 1. These two pieces of deletion indication information are compared with each other in step S504. When these two pieces of deletion indication information are not coincident with each other, it is decided that verification fails. A notice indicating the verification failure is sent in step S511 and the routine of processing is terminated.

When the two pieces of deletion indication information are coincident with each other and when the deletion indication information is not included in the contents storage status report, the encrypted verification information is decrypted (in step S505), management-side verification information is generated (in step S506), the two pieces of verification information are compared with each other (in step S507), judgment as to whether the two pieces of verification information are coincident or not is made (in step S508), a verification number is generated, registered and notified (in step S509), an instruction to update the contents status information is sent (in step S510) and a notice indicating a verification failure is sent (in step S511). The steps S505 to S511 are the same as the steps S203 to S209 in FIG. 7 so that description thereof is omitted.

When the contents storage status report shown in FIGS. 28 and 29 is generated and verified, the details of the contents included in the contents storage status information shown in FIG. 2 can be omitted. Use of the change history information and the verification information is peculiar to the contents distribution system shown in FIG. 1. When the contents distribution system shown in FIG. 1 is used for recognizing deletion of other electronic data, the change history information and the verification information can be omitted.

Although the present invention has been described in detail and with reference to specific embodiments, it is obvious to those skilled in the art that various changes or modifications can be made without departing from the spirit and scope of the invention.

The present application is based on Japanese Patent Application No. 2004-301279 filed on Oct. 15, 2004 and Japanese Patent Application No. 2004-301273 filed on Oct. 15, 2004, the contents of which are incorporated herein by reference.

INDUSTRIAL APPLICABILITY

The present invention is useful as a contents distribution method etc. in which burdens imposed on both a distribution service provider and a contents user are lightened so that the contents user can use contents as many as possible at low cost.

Moreover, the present invention is useful as a data discard recognition method etc. in which discard of electronic data in a terminal apparatus can be recognized easily and reliably.

The invention claimed is:

1. A contents distribution service computer for managing rental pieces of contents distribution through a network, comprising:
   a memory storing a server program and computer executable instructions; and
   a processor in communication with the memory, wherein the processor executing the computer-executable instructions comprises:
   a contents distribution instruction portion operable to execute computer logic to give an instruction to distribute rental pieces of contents to a user terminal connectable to the network in accordance with a contents distribution request given from the user terminal;
   a storage status management portion operable to execute computer logic to manage contents storage status information as management-side contents storage status information, the contents storage status information indicating the storage status of the rental pieces of contents in the user terminal;
   a contents limiting portion operable to execute computer logic to establish a contents usable limit for the user terminal in response to a request for said contents usable limit transmitted from said user terminal, wherein the contents usable limit establishes a predetermined maximum number of rental pieces of contents that can be distributed to the user terminal at a time, the predetermined maximum number of rental pieces of contents being user selectable via the user terminal; and
   a reception portion operable to execute computer logic to receive a contents storage status report containing the contents storage status information in the user terminal, from the user terminal,
   wherein the storage status management portion has a storage status information update function for updating the management side contents storage status information based on the contents storage status report; and
   wherein the contents distribution instruction portion determines a remaining number of rental pieces of content that is less than the predetermined maximum number of rental pieces of contents defined by the contents usable limit in the user terminal based on information concerned with available rental pieces of contents and deleted rental pieces of contents contained in the management-side contents storage status information, and gives an instruction to distribute rental pieces of contents within the remaining number in accordance with the contents distribution request.

2. The contents distribution service computer according to claim 1, further comprising a storage status verification portion that verifies the storage status of the rental pieces of contents in the user terminal based on the contents storage status report and the management-side contents storage status information,
   wherein the storage status management portion updates the management-side contents storage status information when a result of verification by the storage status verification portion is successful; and
   wherein the contents distribution instruction portion gives an instruction to distribute the rental pieces of contents when the result of verification by the storage status verification portion is successful.

3. The contents distribution service computer according to claim 2, wherein the contents storage status report contains change history information indicating a change history of the storage status of the rental pieces of contents in the user terminal; and
   wherein the storage status verification portion verifies the storage status of the rental pieces of contents by comparing the contents storage status information contained in the contents storage status report with contents storage status information obtained based on the change history information and the management-side contents storage status information.

4. The contents distribution service computer according to claim 3, wherein the change history information contained in the contents storage status report indicates a change history unreported from the user terminal.

5. The contents distribution service computer according to claim 3, wherein the storage status management portion manages the change history of the storage status of the rental pieces of contents in the user terminal as management-side change history information;
   wherein the contents storage status report contains verification information obtained by applying a predetermined arithmetic operation to the contents storage status information and the change history information in the user terminal; and
   wherein the storage status verification portion verifies the storage status of the rental pieces of contents by comparing the verification information contained in the contents storage status report with management-side verification information obtained by applying a predetermined arithmetic operation to the management-side contents storage status information and the management-side change history information.

6. The contents distribution service computer according to claim 1, wherein the contents storage status information contains part of details of the rental pieces of contents.

7. A user terminal apparatus for receiving distribution of rental pieces of contents through a network, comprising:
   a memory that stores distributed rental pieces of contents;
   a processor that is operable to execute computer-executable instructions stored in the memory, the memory and the processor executing the computer-executable instructions comprising:
   a contents status holding portion that stores contents storage status information indicating the storage status of the distributed rental pieces of contents and change history information indicating a change history of the storage status of the rental pieces of contents, wherein a capacity of the memory for storing distributed contents is limited to storing no more than a predetermined maximum integer number of rental pieces of contents having a common storage status at any given time, the predetermined maximum number of rental pieces of contents being user selectable via the terminal apparatus and transmitted to a remotely located computer over the network;
   a status report generation portion that generates a contents storage status report containing the contents storage status information;
   a status report output portion that outputs the contents storage status report generated by the status report generation portion; and
   a contents status change portion that changes the storage status of the rental pieces of contents, inclusive of deletion of the rental pieces of contents, stored in the memory, wherein changing the storage status to deletion of the rental pieces of contents increases a remaining number of the memory available for storing additional distributed rental pieces of contents received by the terminal apparatus through the network.

8. The terminal apparatus according to claim 7, wherein the status report generation portion generates a contents storage status report containing the change history information.

9. The terminal apparatus according to claim 8, wherein the change history information is the change history information which has been not output from the status report output portion.

10. The terminal apparatus according to claim 8, wherein the status report generation portion generates verification information obtained by applying a predetermined arithmetic operation to the contents storage status information and the change history information; and
wherein the status report output portion outputs the contents storage status report containing the verification information.

11. The terminal apparatus according to claim 7, wherein the contents storage status information contains part of details of the rental pieces of contents.

12. A data discard recognition computer for recognizing discard of electronic data held in each of user terminal apparatuses through a network, comprising:
a memory for storing management-side status information and computer-executable instructions;
a processor provided with the memory for executing said computer-executable instructions, wherein the processor executing said computer-executable instructions comprises:
a status management portion that manages status information as management-side status information in accordance with the each of terminal apparatuses, the status information indicating the storage status of the electronic data in the terminal apparatus; and
a reception portion that receives a status report based on the status information from the terminal apparatus,
wherein the status management portion has a status update function of updating the management-side status information based on the status report, and a status check function of comparing the management-side status information with the status information contained in the status report to determine whether the electronic data have been discarded from the terminal apparatus or not, and wherein responsive to a determination that the electronic data have been discarded from the terminal apparatus, the status management portion updates the management-side status information to indicate that the terminal apparatus has available capacity below a maximum number of electronic data rentals that can be distributed to the terminal apparatus at a time, said maximum number being user selectable and expandable to increase said maximum number.

13. The data discard recognition computer according to claim 12, wherein the status information at least contains identification information of the electronic data, data discard information indicating discard of the electronic data, and storage place information of the electronic data in the terminal apparatus; and
wherein the status check function determines that the data discard information is valid, when identification information of the electronic data and a storage place information contained in the status report are coincident with the identification information and the storage place information contained in the management-side status information.

14. The data discard recognition computer according to claim 13, wherein the status information contains part of details of the electronic data held in the terminal apparatus; and
wherein the status check function determines that the electronic data are discarded, when the data discard information contained in the status report indicates discard of the electronic data and part of the details of the electronic data contained in the status report is not coincident with part of the details of the electronic data contained in the management-side status information.

15. The data discard recognition computer according to claim 12, wherein the status report at the time of storage of the electronic data in the terminal apparatus contains the status information at the time of storage of the electronic data;
wherein the status report after discard of the electronic data in the terminal apparatus contains discard indication information obtained by applying a predetermined arithmetic operation to at least part of the status information after discard of the electronic data; and
wherein the status check function compares the discard indication information contained in the status report with management-side judgment information obtained by applying a predetermined arithmetic operation to at least part of the management-side status information, and determines that the electronic data are discarded, when the discard indication information and the management-side judgment information are coincident with each other.

16. The data discard recognition computer according to claim 12, wherein the electronic data are contents distributed through the network; and
wherein the status information is contents storage status information indicating the storage status of the contents.

17. A terminal apparatus for holding electronic data operatively connected to the data discard recognition computer according to claim 12, the terminal apparatus comprising:
a status holding portion that stores status information indicating the storage status of the electronic data;
a status report generation portion that generates a status report based on the status information;
a status report output portion that outputs the status report generated by the status report generation portion; and
a status change portion that changes the storage status of the electronic data inclusive of discard of the electronic data,
wherein the status information at least contains identification information of the electronic data, data discard information indicating discard of the electronic data, and storage place information of the electronic data.

18. The terminal apparatus according to claim 17, wherein the status information contains part of details of the electronic data.

19. The terminal apparatus according to claim 17, wherein the status report at the time of storage of the electronic data contains the status information at the time of storage of the electronic data; and
wherein the status report after discard of the electronic data contains discard indication information obtained by applying a predetermined arithmetic operation to at least part of the status information after discard of the electronic data.

20. The terminal apparatus according to claim 17, wherein the electronic data are contents distributed through the network; and
wherein the status information is contents storage status information indicating the storage status of the contents.

* * * * *